(12) United States Patent
Huddleston

(10) Patent No.: US 11,609,112 B2
(45) Date of Patent: Mar. 21, 2023

(54) METER BOX HAVING ADJUSTABLE LENGTH METER COUPLINGS

(71) Applicant: THE FORD METER BOX COMPANY, INC., Wabash, IN (US)

(72) Inventor: Robert W. Huddleston, Twelve Mile, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 135 days.

(21) Appl. No.: 17/317,237

(22) Filed: May 11, 2021

(65) Prior Publication Data

US 2021/0356309 A1    Nov. 18, 2021

Related U.S. Application Data

(60) Provisional application No. 63/079,578, filed on Sep. 17, 2020, provisional application No. 63/023,399, filed on May 12, 2020.

(51) Int. Cl.
*G01F 15/18*    (2006.01)
*G01F 15/00*    (2006.01)
(Continued)

(52) U.S. Cl.
CPC .......... *G01F 15/185* (2013.01); *F16K 27/067* (2013.01); *G01F 15/005* (2013.01); *G01F 15/14* (2013.01)

(58) Field of Classification Search
CPC ...... G01F 15/185; G01F 15/005; G01F 15/14; G01F 15/18; F16K 27/067
See application file for complete search history.

(56) References Cited

U.S. PATENT DOCUMENTS 1,107,532 A    8/1914    Lofton
5,052,721 A *  10/1991   Gorman, Jr. .......... G01F 15/185
                                                      285/31

FOREIGN PATENT DOCUMENTS

CN    204139248 U    2/2015
CN    107631092 A *  1/2018
(Continued)

OTHER PUBLICATIONS

EWE Water Meter Systems; https://www.ewe-armaturen.de/fileadmin/ewe-downloads/prospekte/p-gb_water-meter-systems.pdf; Mar. 2016.
(Continued)

*Primary Examiner* — Francis C Gray
(74) *Attorney, Agent, or Firm* — Barnes & Thornburg LLP

(57) ABSTRACT

Illustrative embodiments of a meter box and couplings, either separately or in combination, are provided. An illustrative embodiment provides a valve coupling that is disposed through a wall of the meter box such that a first portion of the valve coupling extends exterior of the meter box and a second portion of the valve coupling extends interior of the meter box. An outlet coupling is disposed through the wall of the meter box such that a first portion of the outlet coupling extends exterior of the meter box and a second portion of the outlet coupling extends interior of the meter box. A telescoping tube is located in the meter box, extended into and movable relative to, and in fluid communication with, at least one of the second portion of the valve coupling and/or the second portion of the outlet coupling. The telescoping tube varies a distance between the valve coupling and the outlet coupling within the meter box.

22 Claims, 18 Drawing Sheets

(51) Int. Cl.
*F16K 27/06* (2006.01)
*G01F 15/14* (2006.01)

(56) References Cited

FOREIGN PATENT DOCUMENTS

| | | | | | |
|---|---|---|---|---|---|
| CN | 108553661 | A | * | 9/2018 | ............ A61L 11/00 |
| CN | 210600237 | U | * | 5/2020 | |
| JP | 3845586 | B2 | | 11/2006 | |
| JP | 4503278 | B2 | | 7/2010 | |
| JP | 2018096100 | A | | 6/2018 | |
| KR | 100351313 | B1 | | 3/2004 | |
| KR | 100391390 | B1 | | 3/2004 | |
| KR | 2020010159 | A | * | 1/2020 | ............ F16K 1/32 |

OTHER PUBLICATIONS

Reliance Worldwide Corporation (UK) Ltd. Product Guide 2018; www.rwc.co.uk.

Submittal Information; Crescent Box—(CB111-xxx-NL-style); Female Iron Pipe Thread Inlet and Outlet; Straight Brass Inlet Valve By Straight Female Iron Pipe Outlet—The Ford Meter Box Company, Inc.; May 22, 2014.

\* cited by examiner

METER BOX HAVING ADJUSTABLE LENGTH METER COUPLINGS

RELATED APPLICATIONS

The present Application relates to and claims priority to U.S. Patent Application Ser. No. 63/079,578 filed on Sep. 17, 2020, entitled "Adjustable Length Meter Couplings for a Meter Box Including Field Serviceable Meter Couplings" and relates to and claims priority to U.S. Provisional Patent Application Ser. No. 63/023,399 filed on May 12, 2020, entitled "Meter Box Having Adjustable Length Meter Couplings." The subject matter disclosed in these Provisional Applications is hereby expressly incorporated into the present Application.

TECHNICAL FIELD AND SUMMARY

The present disclosure is directed to water meter boxes and, particularly, to a water meter box that can accommodate a meter of varying lengths.

Water meter boxes are enclosures typically placed in the ground outside of a building, house, or dwelling. Such a water meter box contains a water meter that is used to determine the volume of water that enters the building, house, or dwelling. By placing the box with a meter in the ground, the meter can be protected from freezing weather and other environmental hazards. Typically, the meter box includes a lid that can be lifted to allow the meter to be read.

An issue with conventional meter boxes is that one size box may conceivably accommodate various lengths of meters, but standard sized connections (i.e., the ball valve and outlet valve) may not allow for flexibility in the length meter that both fits into the box and attaches to the standard connections. It can be useful, however, in the process of installing a water meter (which may be of unknown length) to have a meter box that can accommodate meters of any variety of lengths.

Accordingly, an illustrative embodiment of the present disclosure provides a meter box. The meter box includes a ball valve coupling disposed through a wall of the meter box. A first portion of the ball valve coupling extends exterior of the meter box and a second portion of the ball valve coupling extends interior of the meter box. An outlet coupling is disposed through the wall of the meter box such that a first portion of the outlet coupling extends exterior of the meter box and a second portion of the outlet coupling extends interior of the meter box. The second portion of the ball valve coupling is located opposite the second portion of the outlet coupling. The ball valve coupling includes a ball valve. The second portion of the ball valve coupling includes a telescoping tube that is in fluid communication with the ball valve. The telescoping tube of the ball valve coupling is selectively extendable from and retractable into the second portion of the ball valve coupling within the meter box. The second portion of the outlet coupling includes a telescoping tube that is in fluid communication with the outlet coupling. The telescoping tube of the outlet coupling is selectively extendable from and retractable into the second portion of the outlet coupling within the meter box. A distance between an end of the telescoping tube of the ball valve coupling and an end of the telescoping tube of the outlet coupling is adjustable when at least one telescoping tube, selected from the group consisting of the telescoping tube of the ball valve coupling and the telescoping tube of the outlet coupling, is moved.

In the above and other illustrative embodiments, the meter box may further comprise: the second portion of the ball valve coupling including a body that has a passageway in fluid communication with the ball valve and a threaded end coupling located at the first portion of the ball valve coupling; the telescoping tube of the ball valve coupling is sized to be fitted into the passageway of the body and is movable therein such that the telescoping tube of the ball valve coupling is in fluid communication with the threaded end coupling; the telescoping tube of the ball valve coupling is movable linearly within the passageway of the body of the ball valve coupling to and from the ball valve; at least one seal that is located between an outer periphery of the telescoping tube of the ball valve coupling and an inner periphery of the passageway; a first protrusion located about the inner periphery of the passageway in the body of the ball valve coupling, a second protrusion located about the outer periphery of the telescoping tube of the ball valve coupling so the first protrusion on the inner periphery of the passageway in the body is engageable with the second protrusion that is located about the outer periphery of the telescoping tube to limit the extent to which the telescoping tube extends from the body of the ball valve coupling; a ring located about the inner periphery of the passageway in the body of the ball valve coupling, a lip located about the outer periphery of the telescoping tube of the ball valve coupling so the ring is selectively engageable with the lip to limit the extent to which the telescoping tube extends from the body of the ball valve coupling; a meter coupling nut coupled to the telescoping tube of the ball valve coupling wherein the coupling nut is configured to be rotatably attachable to a meter; the telescoping tube of the ball valve coupling includes another protrusion that is located about the outer periphery of the telescoping tube to rotatably couple the meter coupling nut to the telescoping tube; and a seal located between the meter coupling nut and the telescoping tube of the ball valve coupling.

In the above and other illustrative embodiments, the meter box may still further comprise: the second portion of the adjustable outlet coupling including a body that has a passageway in fluid communication with a threaded end coupling that is located at the first portion of the adjustable outlet coupling; the telescoping tube of the adjustable outlet coupling being sized to be fitted into the passageway of the body of the adjustable outlet coupling and being movable therein such that the telescoping tube of the adjustable outlet coupling is in fluid communication with the threaded end coupling of the adjustable outlet coupling; the telescoping tube of the adjustable outlet coupling being movable linearly within the passageway of the body of the adjustable outlet coupling; at least one seal that is located between an outer periphery of the telescoping tube of the adjustable outlet coupling and an inner periphery of the passageway of the adjustable outlet coupling; a first protrusion located about the inner periphery of the passageway in the body of the adjustable outlet coupling, and a second protrusion located about the outer periphery of the telescoping tube of the adjustable outlet coupling so the first protrusion on the inner periphery of the passageway in the body of the adjustable outlet coupling is engageable with the second protrusion located about the outer periphery of the telescoping tube of the adjustable outlet coupling to limit the extent to which the telescoping tube extends from the body of the adjustable outlet coupling; a ring that is located about the inner periphery of the passageway in the body of the adjustable outlet coupling, and a lip that is located about the outer periphery of the telescoping tube so the ring is engageable with the lip to limit the extent to which the telescoping tube of the adjustable outlet coupling extends from the body of the adjustable outlet coupling; a meter coupling nut that is coupled to the telescoping tube of the adjustable outlet coupling, wherein the coupling nut is configured to be attachable to a meter; the telescoping tube of the adjustable outlet coupling includes another protrusion that is located about the outer periphery of the telescoping tube to rotatably couple the meter coupling nut to the telescoping tube; a seal located between the meter coupling nut and the telescoping tube of the adjustable outlet coupling; a service nut that has a threaded inner periphery configured to selectively engage and couple to a threaded outer periphery located about a portion of the body of the ball valve coupling, wherein the telescoping tube of the ball valve coupling extends through the service nut, and wherein the service nut limits an extent to which the telescoping tube of the ball valve coupling extends from the body of the ball valve coupling; and a service nut that has a threaded inner periphery configured to selectively engage and couple to a threaded outer periphery located about a portion of the body of the adjustable outlet coupling, wherein the telescoping tube of the adjustable outlet coupling extends through the service nut, and wherein the service nut limits an extent to which the telescoping tube of the adjustable outlet coupling extends from the body of the adjustable outlet coupling.

Another illustrative embodiment of the present disclosure provides a meter box. A valve coupling is disposed through a wall of the meter box such that a first portion of the valve coupling extends exterior of the meter box and a second portion of the valve coupling extends interior of the meter box. An outlet coupling is disposed through the wall of the meter box such that a first portion of the outlet coupling extends exterior of the meter box and a second portion of the outlet coupling extends interior of the meter box. A telescoping tube is located in the meter box, extended into and movable relative to, and in fluid communication with, at least one coupling that is selected from the group consisting of the second portion of the valve coupling and the second portion of the outlet coupling. The telescoping tube varies a distance between the valve coupling and the outlet coupling within the meter box.

Additional features and advantages of the meter box having adjustable length meter box couplings will become apparent to those skilled in the art upon consideration of the following detailed descriptions exemplifying embodiments of the meter box having adjustable length meter box couplings as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
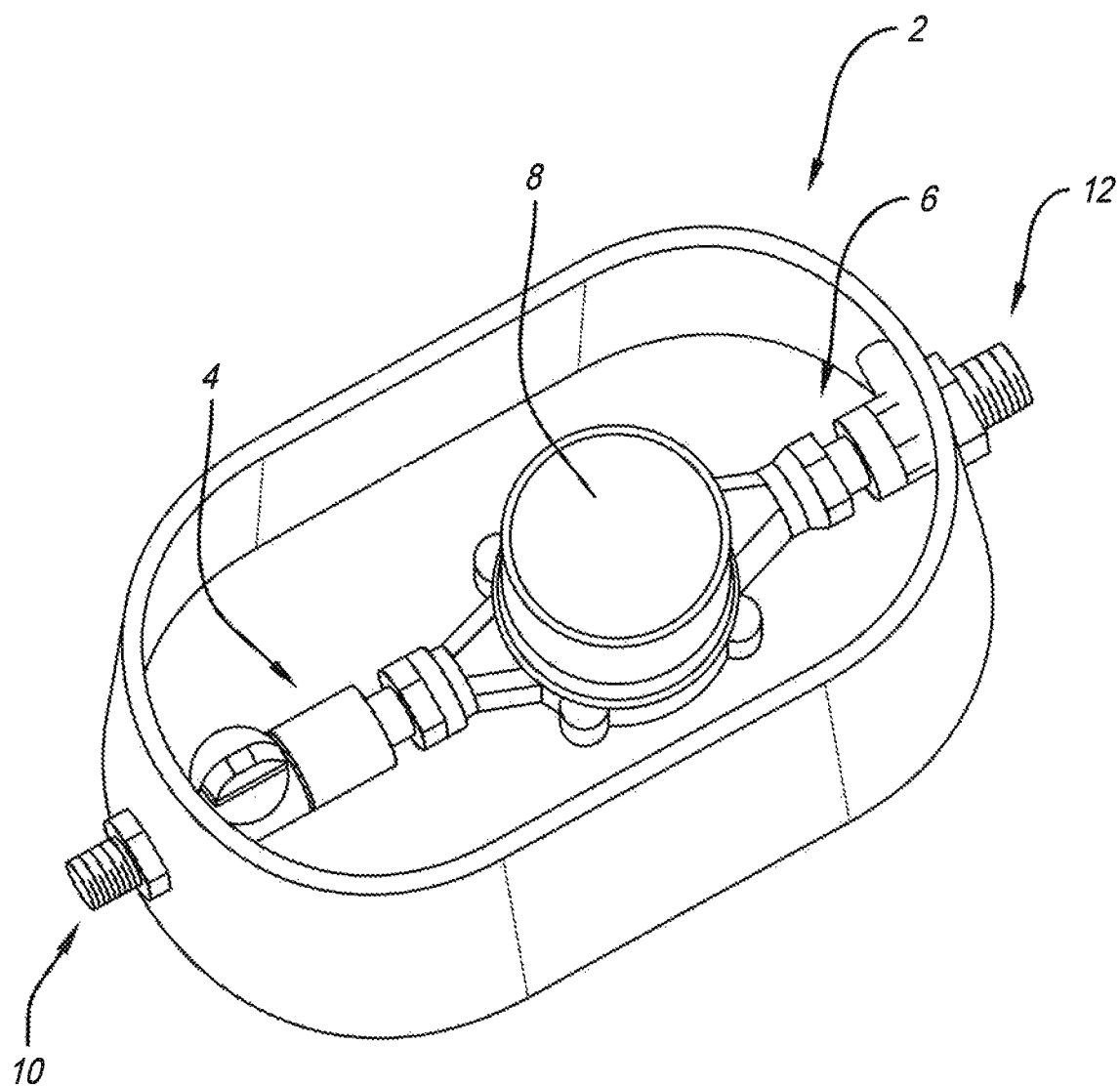
FIG. 1 is a top perspective view of a meter box that includes an adjustable valve and an adjustable outlet coupling.

Corresponding reference characters indicate corresponding parts throughout the several views. The exemplification set out herein illustrates embodiments of the meter box having adjustable length meter couplings, and such exemplification is not to be construed as limiting the scope of the meter box having adjustable length meter couplings in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a meter box having meter couplings on each side. One of the couplings may be a ball valve coupling and the other an outlet coupling. Under conventional circumstances where the length of the meter is known to fit preinstalled ball valve and outlet couplings, the meter can be summarily attached thereto. In contrast, and according to an illustrative embodiment, under circumstances where the length of the meter is not known, either one, the other, or both of the ball valve coupling or outlet coupling may include a telescoping expansion coupling body. These telescoping expansion coupling bodies may extend or retract in their respective coupling bodies to lengthen or shorten the coupling's length to accommodate meters of varying lengths with relative ease. Accordingly, the disclosure herein may be used with water meters having any variety of lengths, including but not limited to, from about 110 mm to about 165 mm. Thus, the same meter box may accommodate a 110 mm meter just as easy as it may accommodate a 165 mm meter, along with any other length, for example.

The present disclosure will be described hereafter with reference to the accompanying drawings which are given as non-limiting examples only.

A top perspective view of meter box 2, which includes an adjustable ball valve 4 and an adjustable outlet coupling 6, is shown in FIG. 1. Further shown in this view is a meter 8 fluidly coupled to adjustable ball valve 4 and adjustable outlet coupling 6. It is appreciated that meter 8 may be a variety of lengths. It is further appreciated that adjustable ball valve 4 includes an outlet end 10 located exterior of meter box 2. Adjustable outlet coupling 6 similarly includes an outlet end 12 extending exterior of meter box 2 as illustratively shown. It is further appreciated that outlet end 10 and 12 couple to a water supply and dwelling pipes, respectively, so that water may be supplied from an exterior source through meter 8 and then into the building, home, or dwelling (not shown).

Figure 2:
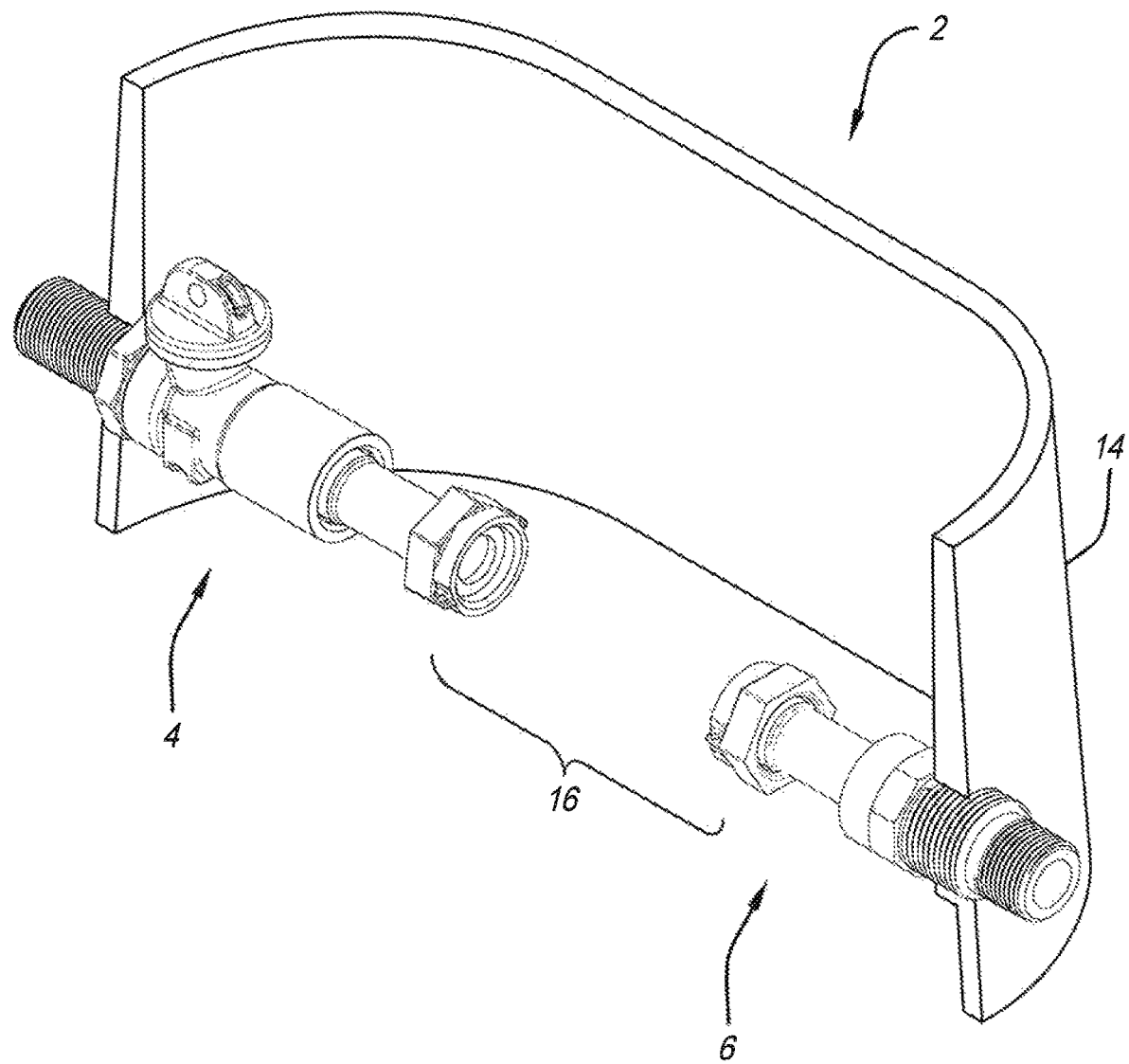
FIG. 2 is a perspective cutaway view of the meter box showing the adjustable valve and adjustable outlet coupling.

A perspective cutaway view of meter box 2, showing adjustable ball valve 4 and adjustable outlet coupling 6 attached thereto (with meter 8 removed), is shown in FIG. 2. This view depicts how both adjustable ball valve 4 and adjustable outlet coupling 6 extend through sidewall 14 to form meter box 2. It is appreciated from this view how a space 16 located between adjustable ball valve 4 and adjustable outlet coupling 6 exists to accommodate a water meter. Depending on the length of the water meter, however, the actual length of space 16 may need to be larger or smaller. Prior to these embodiments, components inside the box would be removed and replaced by different fitting components. Alternatively, depending on the length of the meter, the entire meter box might be replaced.

In order to accommodate meters of different lengths while using the same meter box 2, either the ball valve, outlet coupling, or both, may be adjustable in length to accommodate larger or smaller meters. In this instance the ball valve is used to allow or restrict the flow of water to the user. It is appreciated, however, that the embodiments herein are not restricted to a ball valve. For example, a key valve or other type valve may be used.

Figure 3:
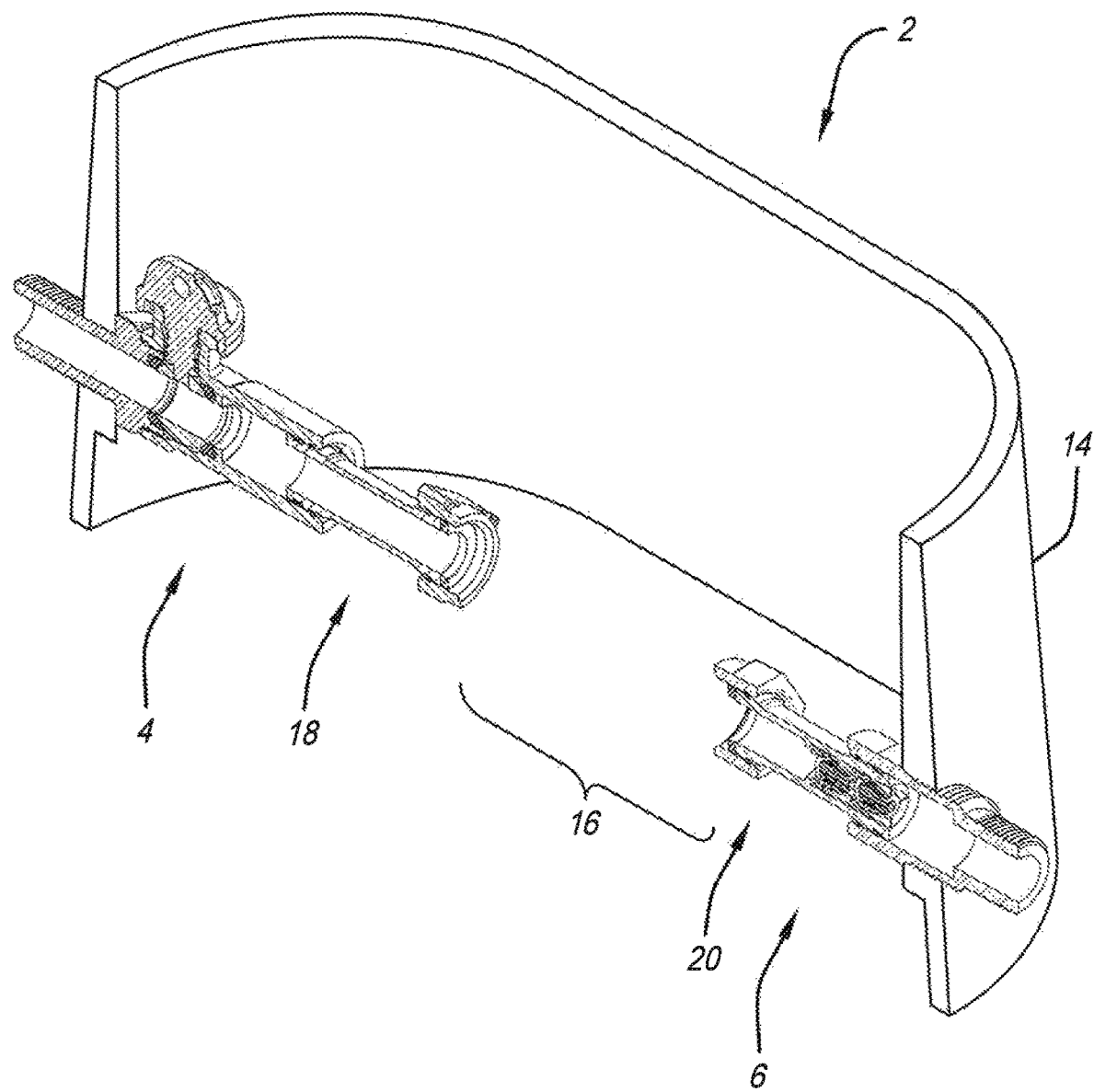
FIG. 3 is another perspective cutaway view of the meter box.

In the perspective cutaway view of meter box 2 shown in FIG. 3, both the adjustable ball valve 4 and adjustable outlet coupling 6 are shown in cross-section as well. Further, adjustable ball valve 4 is shown with its telescoping expansion coupling body 18 located in an extended position (compare to FIG. 2). Likewise, a telescoping expansion coupling body 20 is shown extended from adjustable outlet coupling 6. The effect of these telescoping expansion coupling bodies is to selectively vary space 16 between adjustable ball valve 4 and adjustable outlet coupling 6. The effect of this is that a smaller meter may be placed in space 16 and either one or both of telescoping expansion coupling bodies or tubes 18 and/or 20 may extend to engage the meter. In this way, the same meter box 2 may be used for a variety of different length meters, many of which might not be otherwise usable. It is also appreciated that the ball valve and outlet couplings, despite shown herein as both having telescoping expansion coupling bodies, may alternatively not both be adjustable. For example, in an embodiment, the ball valve may include a telescoping expansion coupling body whereas the outlet coupling may not. The outlet coupling may just be a conventional coupling with no telescoping expansion coupling body. Conversely, in another embodiment, the ball valve in a meter box may be conventional with no telescoping expansion coupling body, whereas, the outlet coupling is an adjustable outlet coupling that includes the telescoping expansion coupling body. All of these different variations are within the scope of this disclosure. In addition, other couplings may employ the telescoping expansion coupling body alternative to the ball valve and outlet coupling.

Figure 4:
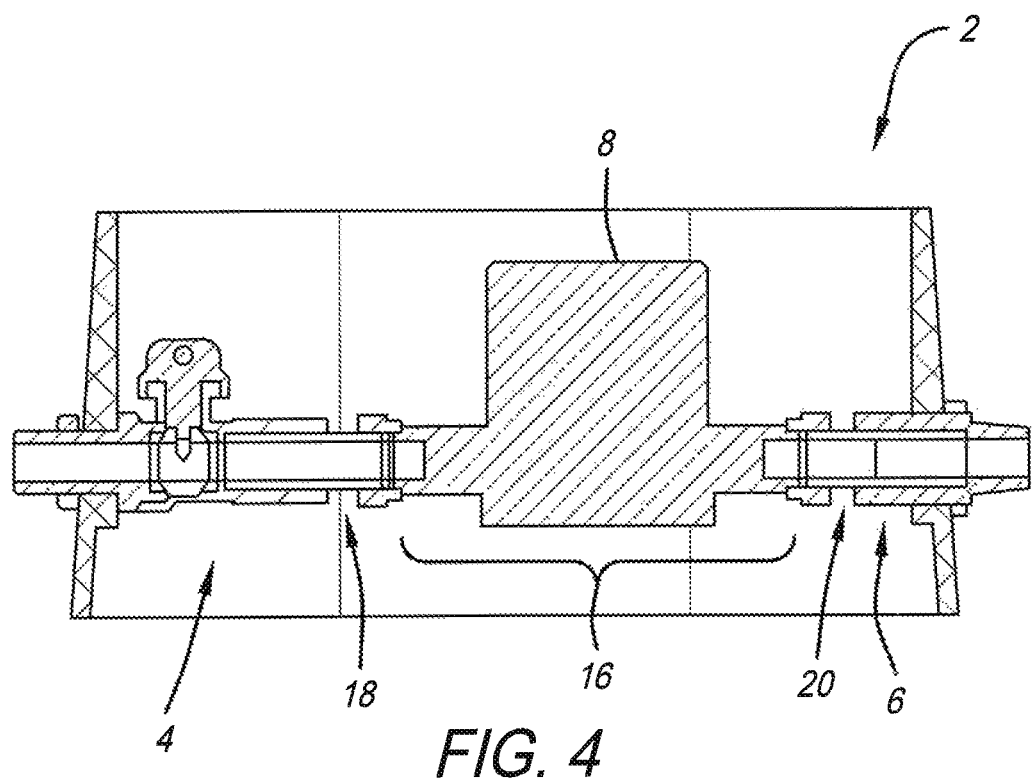
FIG. 4 is a side cross-sectional view of the meter box.
Figure 5:
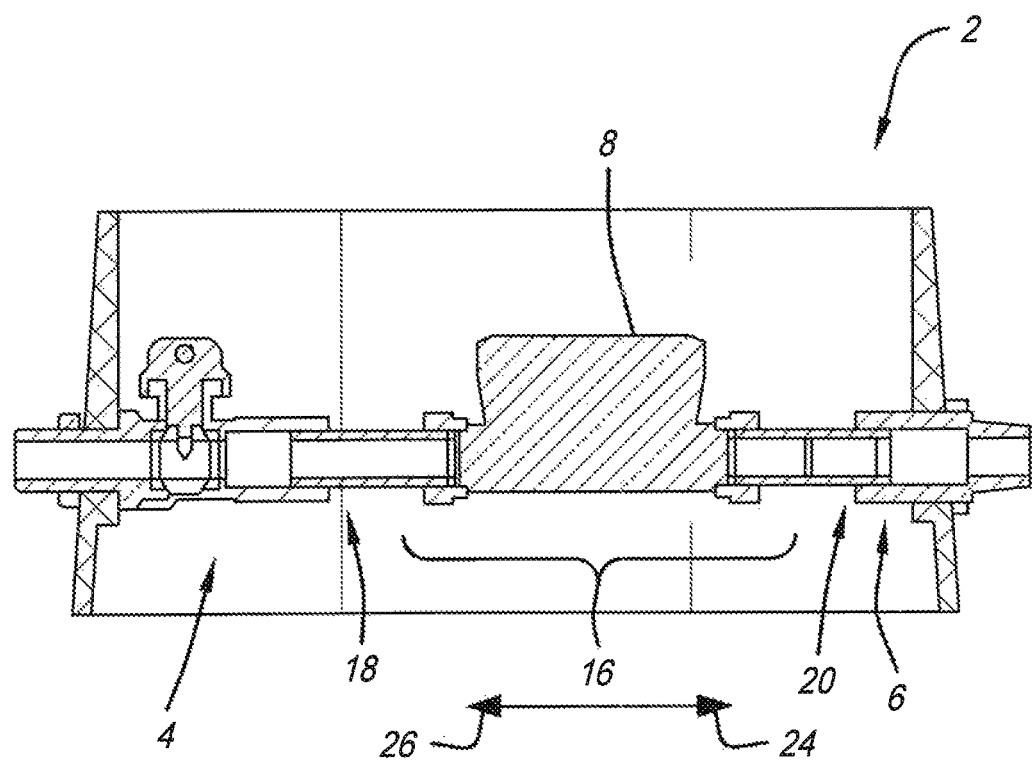
FIG. 5 is another side cross-sectional view of the meter box.

Side cross-sectional views of meter box 2 are shown in FIGS. 4 and 5. Both of these views depict adjustable ball valve 4 and adjustable outlet coupling 6 being fluidly attached to a meter. A distinction, however, is that meter 8, shown in FIG. 4, is illustratively a larger meter than meter 22 shown in FIG. 5. As shown in FIG. 4, meter 8 is representative of about a 165 mm-15 mm meter whereas meter 22 in FIG. 5 is representative of about a 110 mm-15 mm meter. Because of its relatively larger length, meter 8 occupies much of space 16 and, thus, telescoping expansion coupling bodies 18 and 20, from adjustable ball valve 4 and adjustable outlet coupling 6, respectively, do not need to extend much towards meter 8 in order to couple same. In contrast, as shown in FIG. 5, meter 22 is shorter than meter 8 in FIG. 4. They both may have similar meter sizes but just vary in length. The expandable valve and expandable outlet coupling compensate for the variance in length. Meter 22 is smaller than meter 8 and, thus, occupies less of space 16 than meter 8 does. Because of the shorter length, both telescoping expansion coupling body 18, of adjustable ball valve 4 and telescoping expansion coupling body 20, of adjustable outlet coupling 6, are further extended in directions 24 and 26, respectively, thereby further extending into space 16 and coupling to meter 22. It is appreciated that the extent to which each of telescoping expansion coupling bodies 18 and 20 extend, if at all, may vary depending on the length of the meter. For example, depending on the meter length and desired location of same, telescoping expansion coupling body 18 may be extended into space 16 further than telescoping expansion coupling body 20—or vice versa. It is also appreciated that the manner in which telescoping expansion coupling bodies 18 and 20 actually attach to the meter, whether meter 8, meter 22, or a meter of other length, may be accomplished in a conventional manner known by those skilled in the art.

Figure 6:
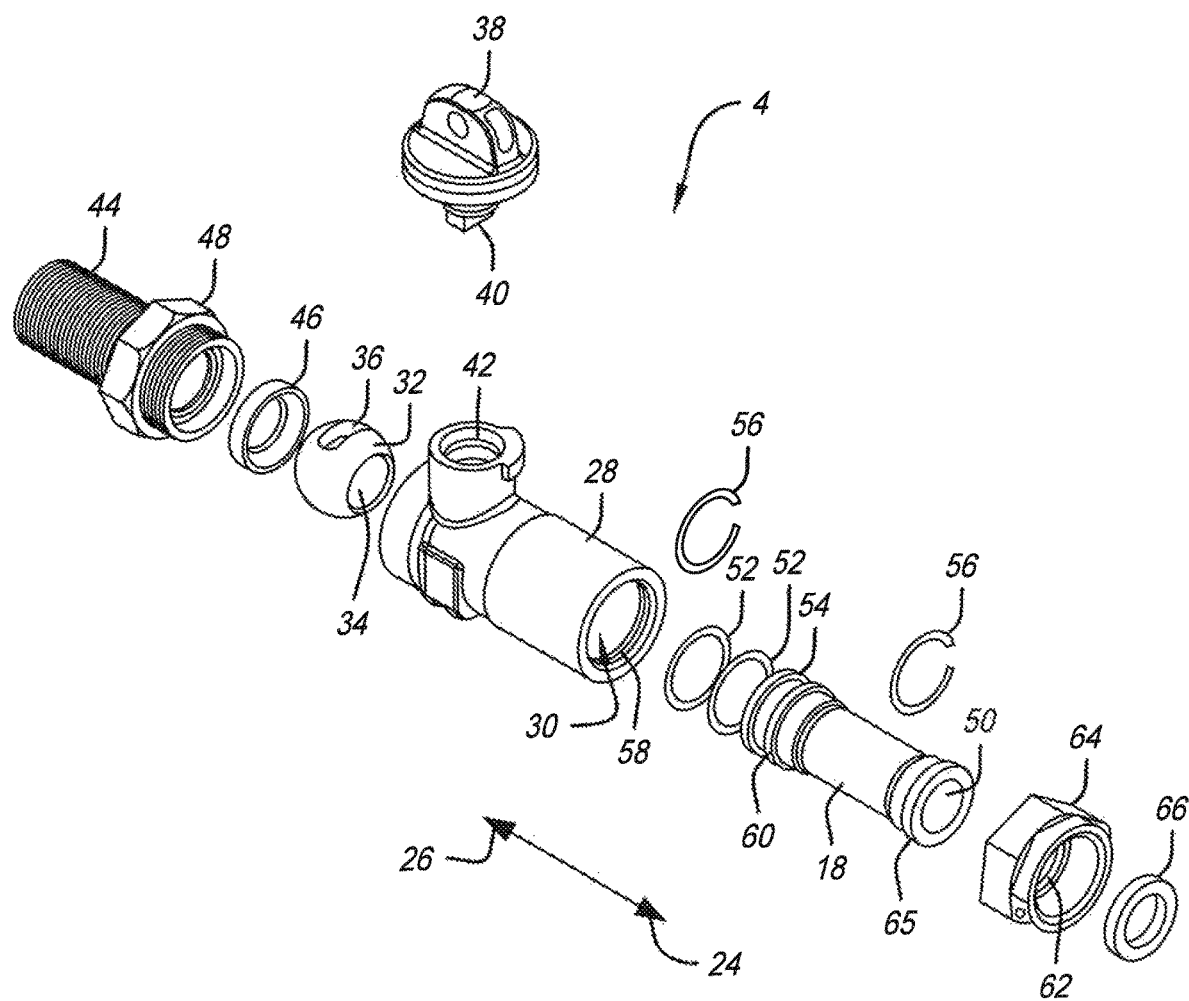
FIG. 6 is an exploded perspective view of the adjustable valve.

An exploded perspective view of adjustable ball valve 4 is shown in FIG. 6. As depicted herein, adjustable ball valve 4 includes a body 28 that includes passageway 30. Within passageway 30 is a ball valve member 32 that includes its own passageway 34 and knob bore 36. Knob 38, with a key member 40 extending therefrom, is fitted into opening 42, extending illustratively perpendicular to passageway 30.

Ball valve member 32 fits into passageway 30 with its knob bore 36 engageable with key member 40 of knob 38 allowing same to engage ball valve member 32 to rotate same between open and closed positions. When in the closed position, ball valve member 32 blocks fluid from passing through body 28. Conversely, rotating knob 38 rotates ball valve member 32 fluidly aligning passageway 34 with passageway 30, thereby allowing water or other fluid to pass therethrough.

A threaded end coupling 44 attaches to body 28 to capture ball valve member 32. A cupped gasket 46 serves as a seal between ball valve member 32 and threaded end coupling 44. Illustratively, nut 48 threads onto threaded end coupling 44 and may serve to secure adjustable ball valve 4 to sidewall 14 of meter box 2 (see FIG. 1). End coupling 44 may extend through an opening in sidewall 14. Telescoping expansion coupling body 18 is sized to be fitted into passageway 30. A passageway 50 disposed through telescoping expansion coupling body 18 provides fluid communication with passageway 34 of ball valve member 32. Additionally, telescoping expansion coupling body 18 is movable in directions 24 and 26 to and from body 28 of adjustable ball valve ball 4. A seal may be placed between the outer periphery of telescoping expansion coupling body 18 and the inner periphery of passageway 30 to prevent any water or other fluid from leaking between body 28 and telescoping expansion coupling body 18. In this illustrative embodiment, at least one O-ring or a pair of O-rings 52 may be disposed in illustrative channel 54 disposed about the periphery of telescoping expansion coupling body 18 to provide such sealing. A snap ring 56 may be placed in a channel 58 located about the periphery of passageway 30 in body 28. A lip 60 may be formed about the periphery of telescoping expansion coupling body 18 so that once it is assembled to body 28, and with snap ring 56 in place, telescoping expansion coupling body 18 may move back and forth in directions 24 and 26 to the extent lip 60 engages snap ring 56. At that point telescoping expansion coupling body 18 cannot extend any further. This limits the extent to which telescoping expansion coupling body 18 can extend from body 28. Another snap ring 56 may be coupled to end channel 62 located about the inner periphery of meter coupling nut 64 to allow same to be rotatably secured to the end of telescoping expansion coupling body 18 opposite body 28. A lip 65 on the outer periphery of telescoping expansion coupling body 18 engages snap ring 56 to couple meter coupling nut 64 to telescoping expansion coupling body 18. It is appreciated that meter coupling nut 64 may be rotated to secure onto meter 8, meter 22, or other meter. An illustrative gasket 66 is disposable in nut 64 to create a seal between the coupling on the meter (not shown in this view) and meter coupling nut 64 to prevent any leaking therebetween.

Figure 7:
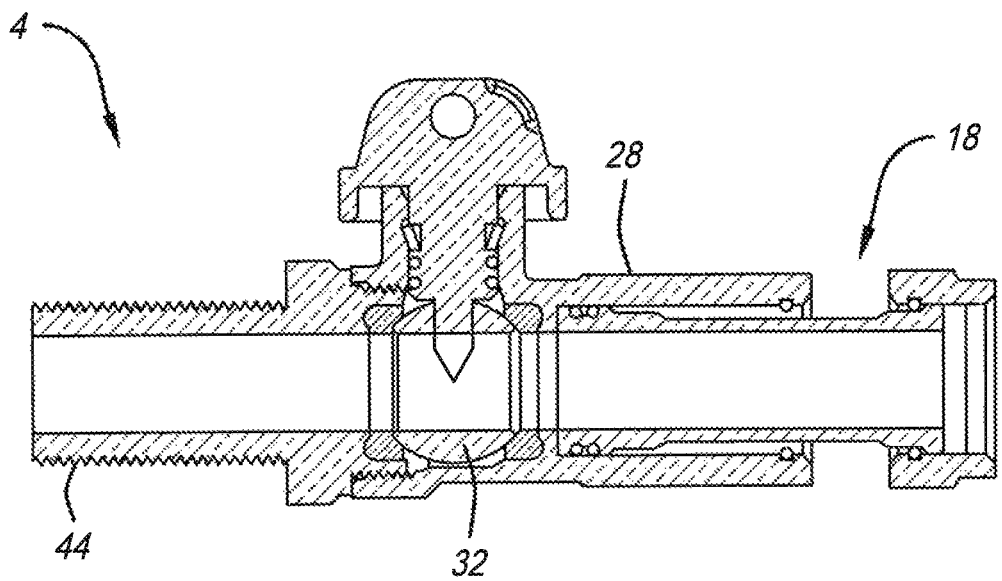
FIG. 7 is a side cross-sectional view of the adjustable valve.
Figure 8:
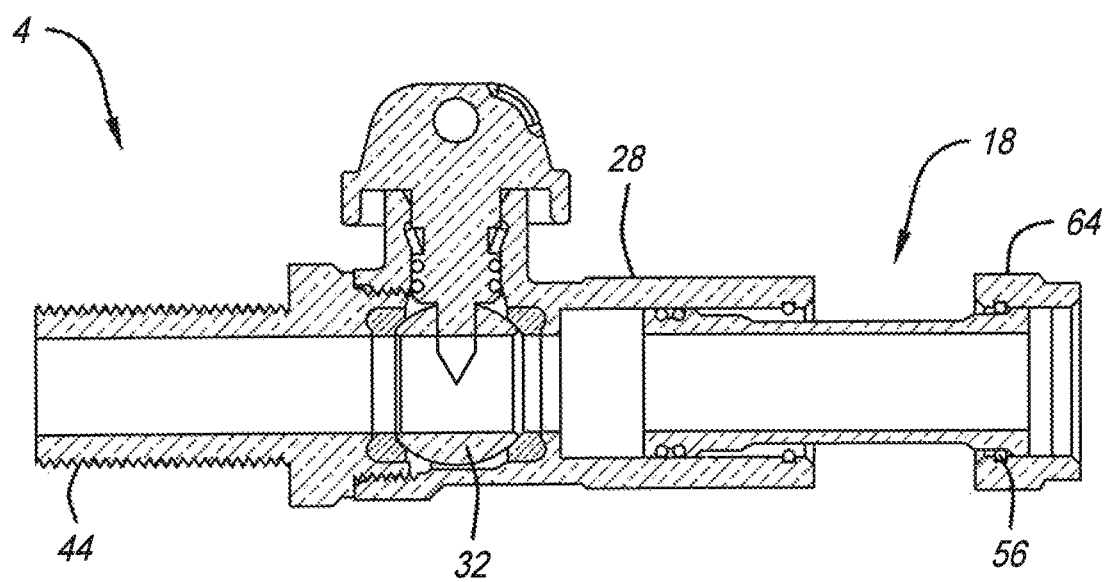
FIG. 8 is another side cross-sectional view of the adjustable valve.
Figure 9:
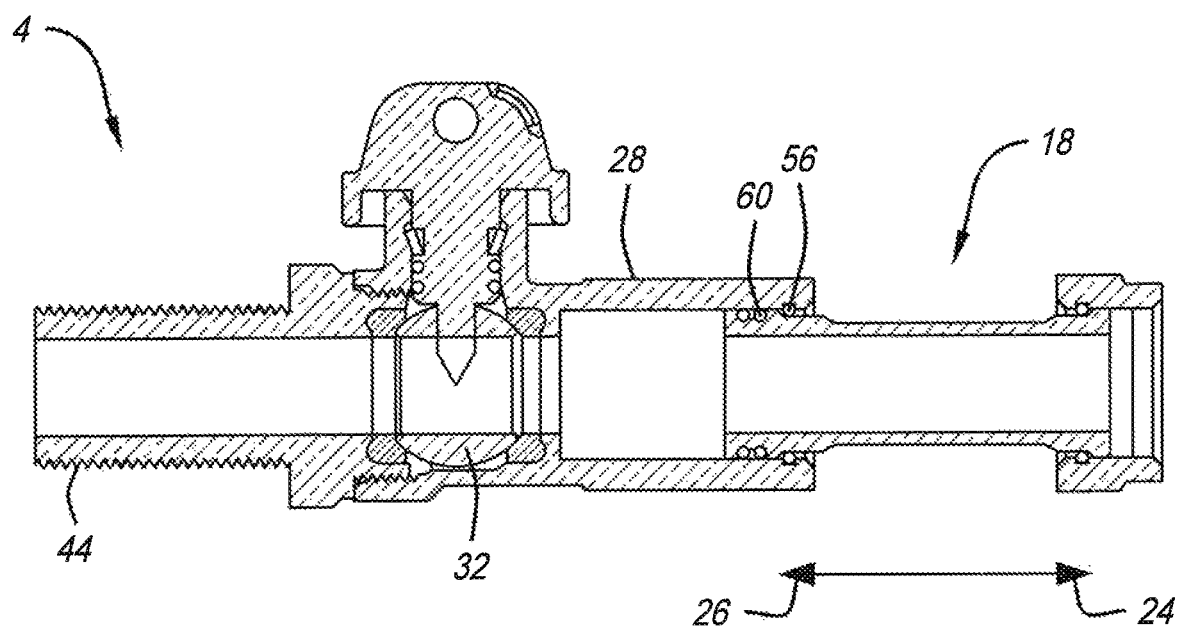
FIG. 9 is another side cross-sectional view of the adjustable valve.

Side cross-sectional views of adjustable ball valve 4 are shown in FIGS. 7, 8, and 9. These views depict a progression to which telescoping expansion coupling body 18 may extend or retract in directions 24 and 26, respectively. As shown in FIG. 7, telescoping expansion coupling body 18 extends from body 28, of adjustable ball valve 4, in direction 24, only a limited extent. In contrast, as shown in FIG. 8, telescoping expansion coupling body 18 extends farther in direction 24 than that shown in FIG. 7. Still further, and as shown in FIG. 9, telescoping expansion coupling body 18 extends to its fullest extent where lip 60 of telescoping expansion coupling body 18 engages snap ring 56 of body 28, thereby limiting the extension of telescoping expansion coupling body 18. It is appreciated from these progression views how, depending on the length of the meter, telescoping expansion coupling body 18 may be extended out from or back into body 28 to allow attachment to the particularly sized meter. These views also depict how meter coupling nut 64 is maintained on telescoping expansion coupling body 18 via snap ring 56 secured onto same. By these structures, fluid may enter threaded end coupling 44, flow through ball valve member 32, and through telescoping expansion coupling body 18, regardless of the extent to which same is extended or retracted from body 28 (without leaking).

Figure 10:
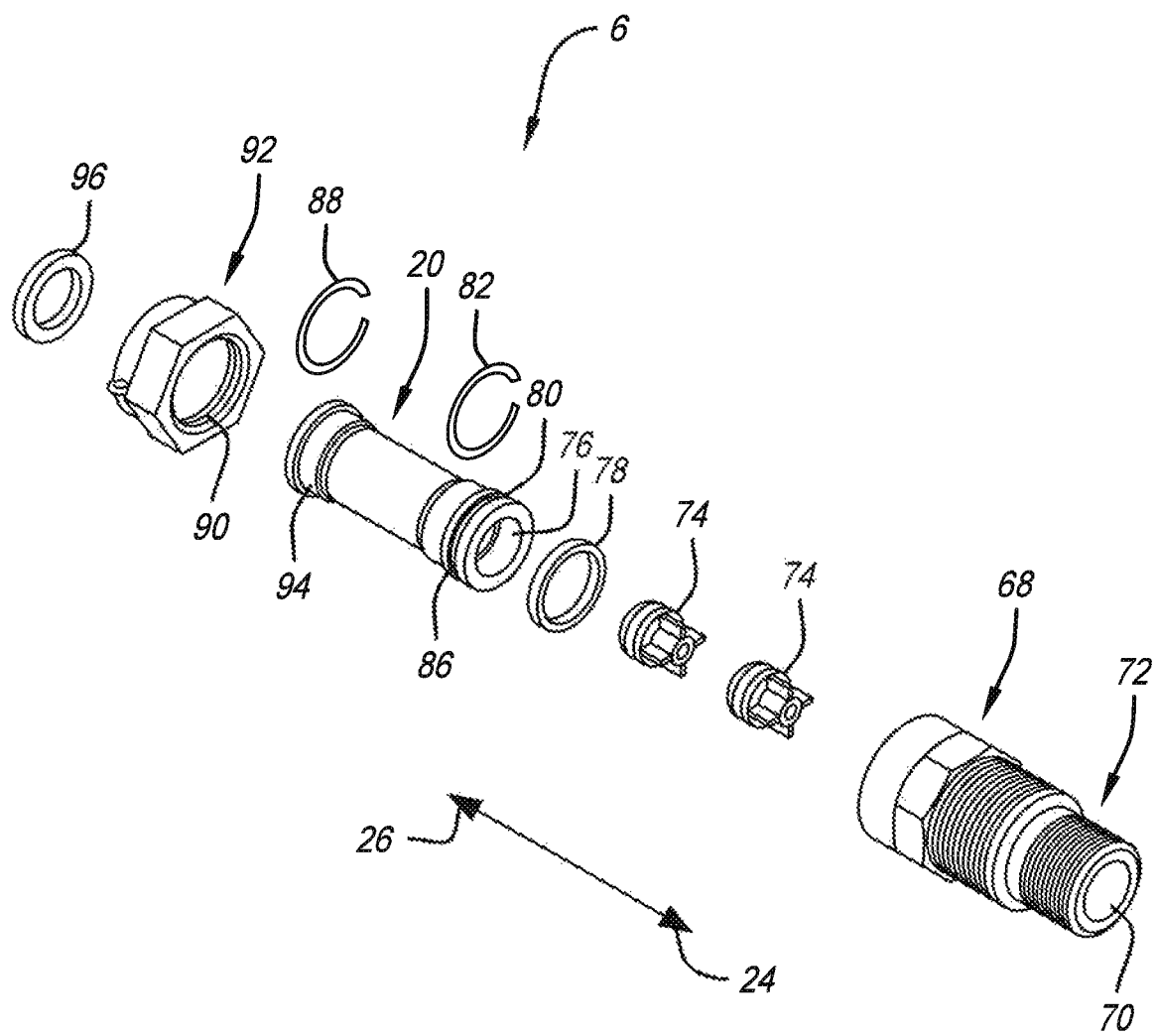
FIG. 10 is an exploded perspective view of the adjustable outlet coupling.

A perspective exploded view of adjustable outlet coupling 6 is shown in FIG. 10. As shown herein, adjustable outlet coupling 6 includes a body 68 with passageway 70 disposed therethrough. The outer periphery of body 68 may at be least partially threaded via threads 72, as illustratively shown, to facilitate attachment of adjustable outlet coupling 6 to sidewall 14 of meter box 2 (see, also, FIGS. 1-5). In an illustrative embodiment, optional check valves 74 may be disposed in passageway 70 to allow water or other fluid to pass in one direction, but not in the other. For example, in this illustrated view, fluid may pass in direction 24, which would be coming from the meter, flow-through passageway 70, and into a pipe attached to body 68, which leads into a building or dwelling. That fluid, however, because of the check valves, will not be able to flow back in direction 26 towards the meter. In an illustrative embodiment, multiple check valves may be employed. It will be appreciated by the skilled artisan upon reading this disclosure, however, that one, more than one, or no check valves may be employed in adjustable outlet coupling 6. It will depend on the particular need of the waterworks circuit, and all variations are within the scope of this disclosure.

Telescoping expansion coupling body 20 includes its own passageway 76 disposed therethrough. Telescoping expansion coupling body 20 is sized to fit into passageway 70 of body 68 so there is fluid communication between passageways 70 and 76 (illustratively with check valves 74 in fluid communication as well). An O-ring 78 fits on peripheral surface 80 of telescoping expansion coupling body 20 to provide a sealing function between telescoping expansion coupling body 20 and the surface of passageway 70 to prevent any leaking there between. A snap ring 82 fits in an illustrative peripheral cavity 84 of passageway 70 (see, also, FIGS. 11-13) to limit the extent to which telescoping expansion coupling body 20 may extend from body 68 of adjustable outlet coupling 6. A lip 86 may be formed about the outer periphery of telescoping expansion coupling body 20 to engage snap ring 82, thereby limiting the extension of telescoping expansion coupling body 20 (see, also, FIG. 13). Similar to adjustable ball valve 4, a snap ring 88 fits into channel 90 of nut 92. Another lip 94 on telescoping expansion coupling body 20 rotatably secures nut 92 onto telescoping expansion coupling body 20. A gasket 96 is positioned in nut 92 to provide sealing between nut 92 and either meter 8, meter 22, or other different length meter.

Figure 11:
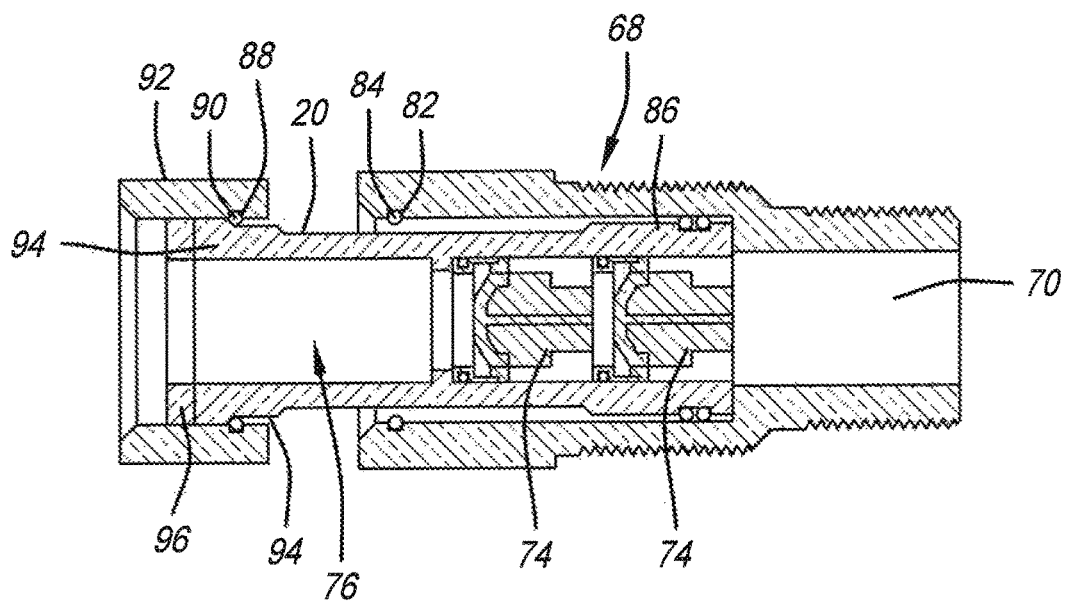
FIG. 11 is a side cross-sectional view of the adjustable outlet coupling.
Figure 12:
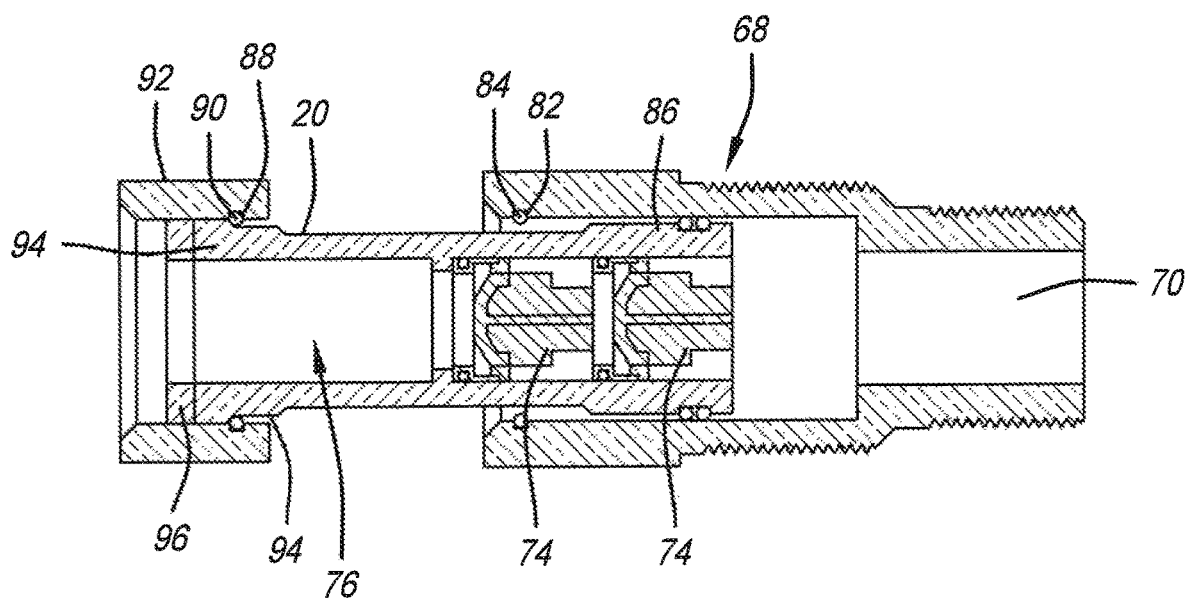
FIG. 12 is another side cross-sectional view of the adjustable outlet coupling.
Figure 13:
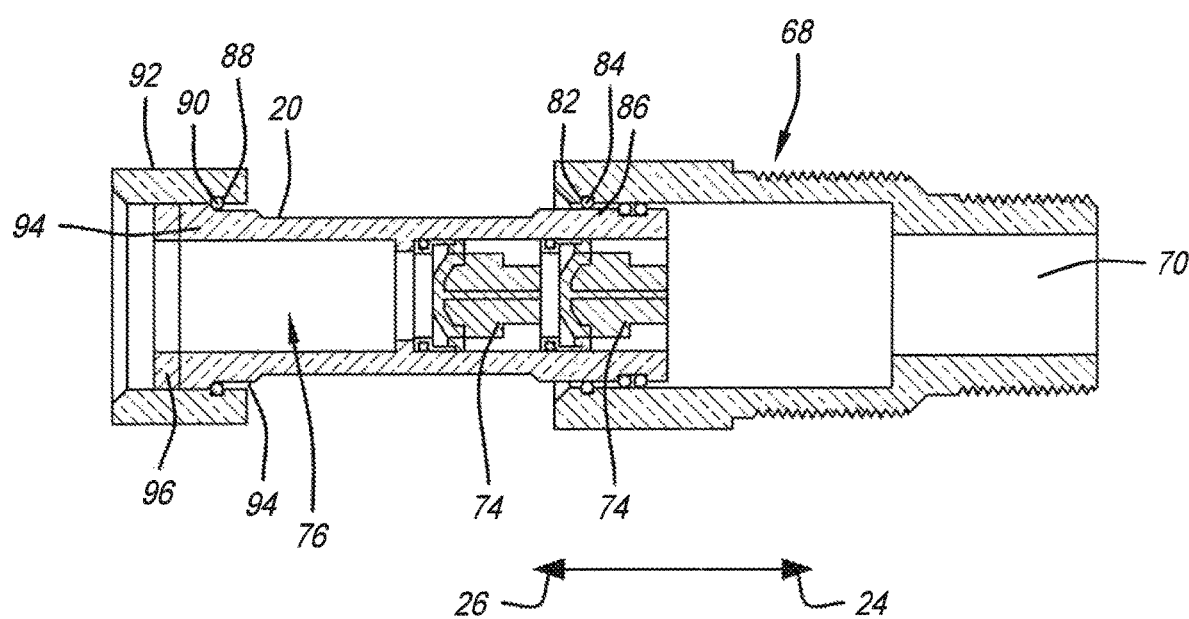
FIG. 13 is another side cross-sectional view of the adjustable outlet coupling.

Side cross-sectional views of adjustable outlet coupling 6 are shown in FIGS. 11, 12, and 13. These views, like the progression views of adjustable ball valve 4 shown in FIGS. 7, 8, and 9, depict the progression to which telescoping expansion coupling body 20 may extend or retract in directions 26 and 24. As shown in FIG. 11, telescoping expansion coupling body 20 extends in direction 26 from body 68 of adjustable outlet coupling 6, only a limited extent. In contrast, as shown in FIG. 12, telescoping expansion coupling body 20 extends farther in direction 26 than that shown in FIG. 11. Still further, as shown in FIG. 13, telescoping expansion coupling body 20 extends to its fullest extent where lip 86, of telescoping expansion coupling body 20, engages a snap ring 82 fitted in peripheral cavity 84. This limits the extent to which telescoping expansion coupling body 20 extends from body 68.

Figure 14:
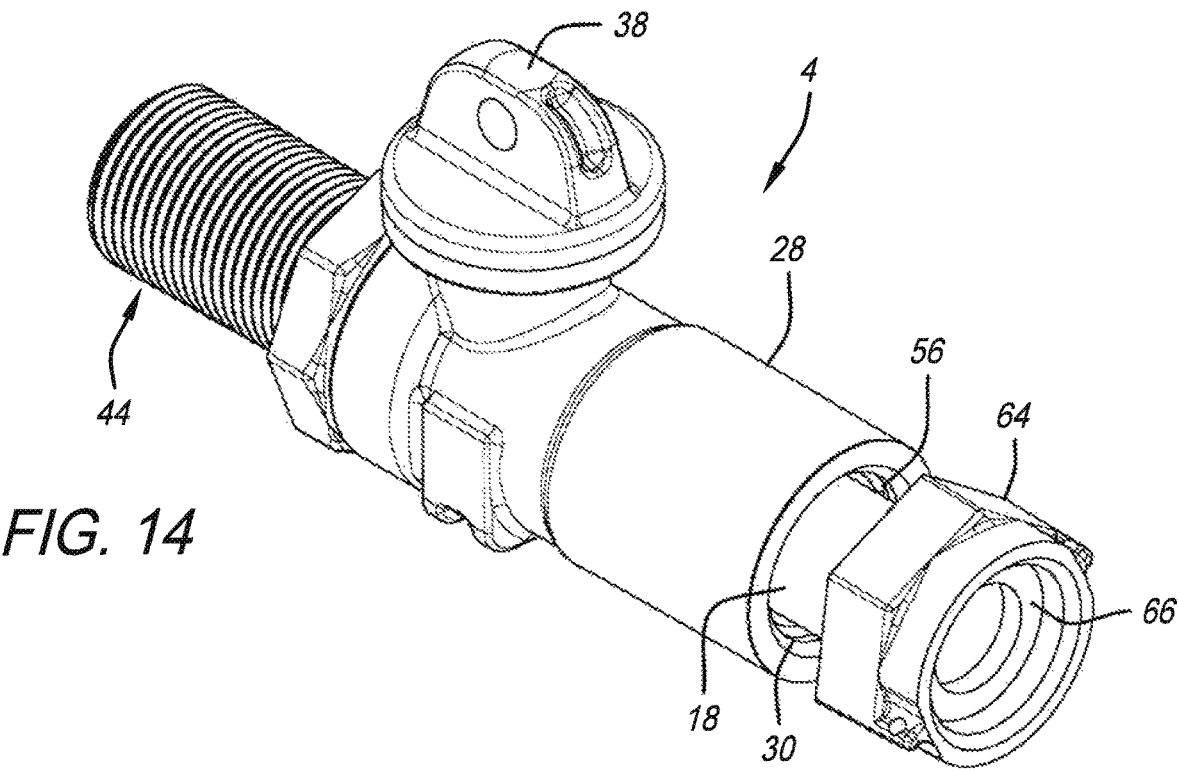
FIG. 14 is a perspective view of the adjustable valve.
Figure 15:
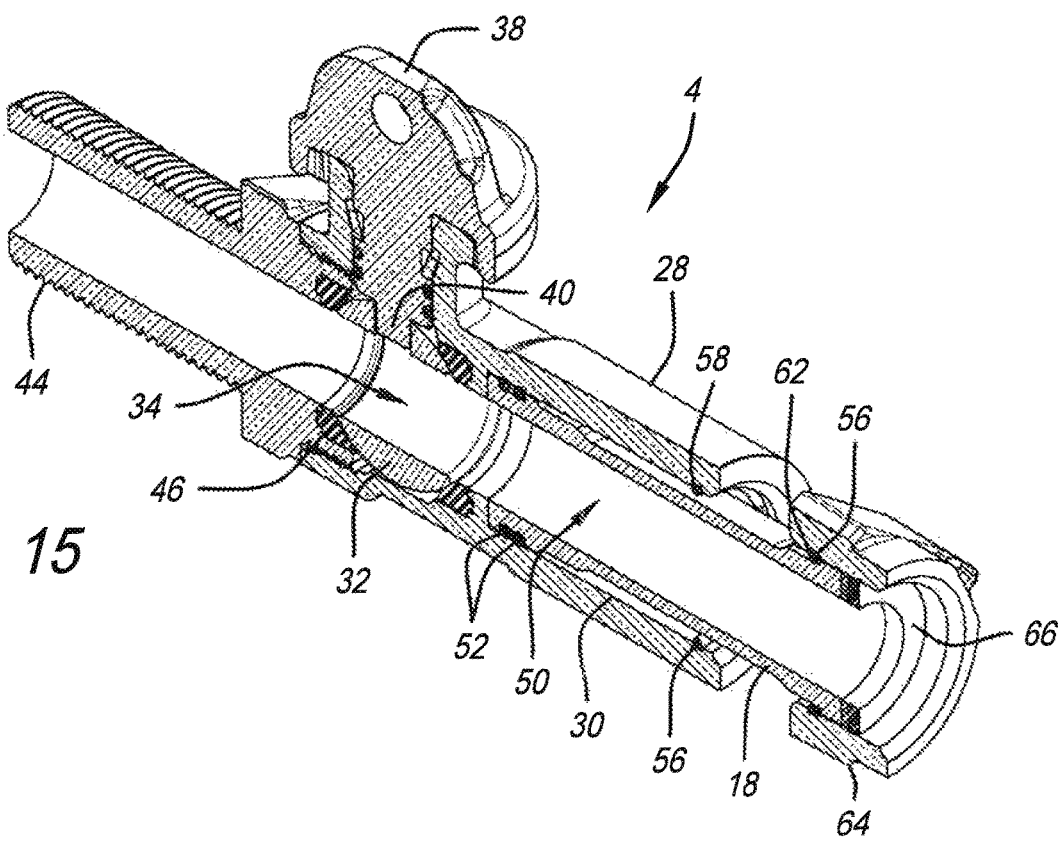
FIG. 15 is a perspective cutaway view of the adjustable valve.

Perspective and perspective cutaway views of adjustable ball valve 4, with telescoping expansion coupling body 18 positioned in its retracted state, are shown in FIGS. 14 and 15, respectively. As shown in FIG. 14, with telescoping expansion coupling body 18 retracted into body 28, more space 16 (see, also, FIG. 4) is available to receive a larger meter yet still couple to adjustable ball valve 4 at meter coupling nut 64. This view also shows snap ring 56 located in passageway 30 to limit the extent to which telescoping expansion coupling body 18 may extend from body 28.

In the perspective cutaway view of FIG. 15, snap ring 56 is shown fitting into channel 58 at the outer periphery of passageway 30. The dual O-rings 52 are shown to provide a seal between the peripheries of passageway 30 and telescoping expansion coupling body 18. Similarly, another snap ring 56 is shown fitted into end channel 62 in meter coupling nut 64 to secure same to telescoping expansion coupling body 18. Lastly, gasket 66 is positioned at the end of telescoping expansion coupling body 18.

Figure 16:
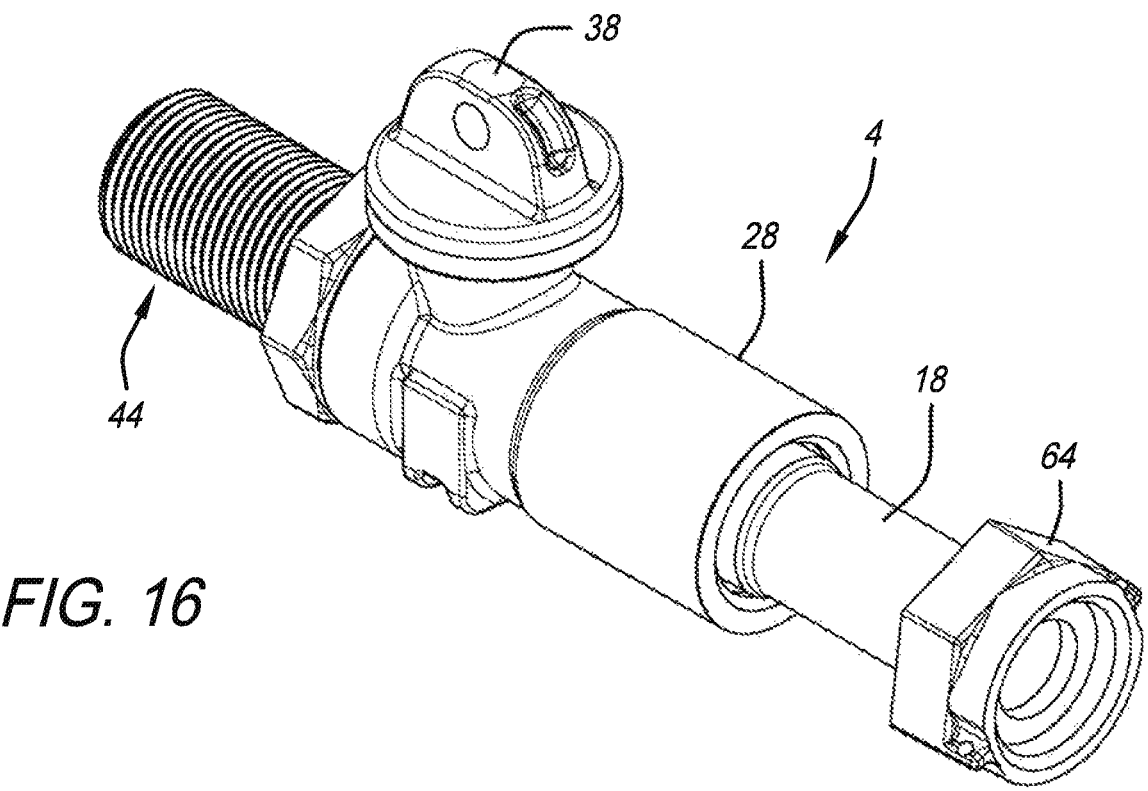
FIG. 16 is another perspective view of the adjustable valve.
Figure 17:
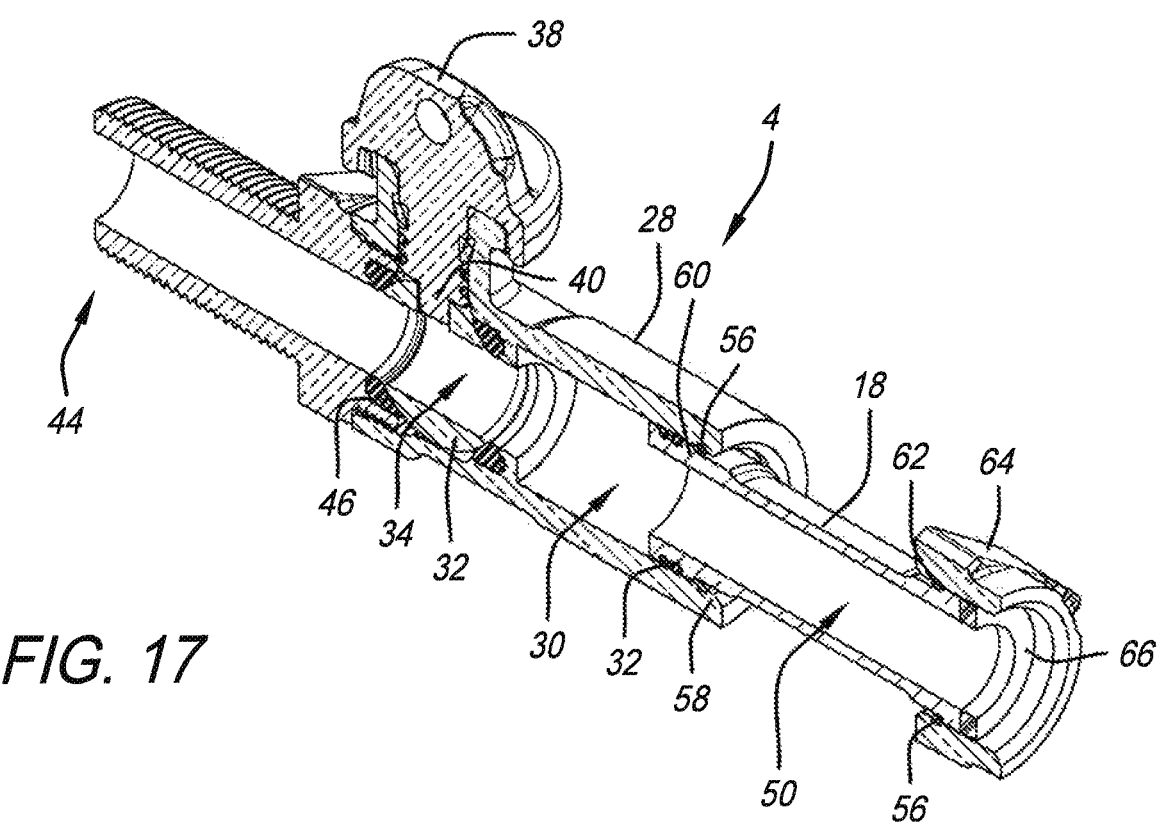
FIG. 17 is another perspective cutaway view of the adjustable valve.

Perspective and perspective cutaway views of adjustable ball valve 4 are shown in FIGS. 16 and 17, respectively. As shown in FIG. 16, telescoping expansion coupling body 18 is extended to its fullest extent. This will reduce space 16 so that a meter of shorter length may be fitted in space 16.

In the cutaway view of FIG. 17, lip 60, telescoping expansion coupling body 18, is shown engaged with snap ring 56, thereby limiting the extent to which telescoping expansion coupling body 18 extends from body 28. It is appreciated from this view and the other views how water or other fluid may pass through passageway's 30 and 50, for example, into a meter without that fluid leaking from adjustable ball valve 4, regardless of how far telescoping expansion coupling body 18 extends from body 28.

Figure 18:
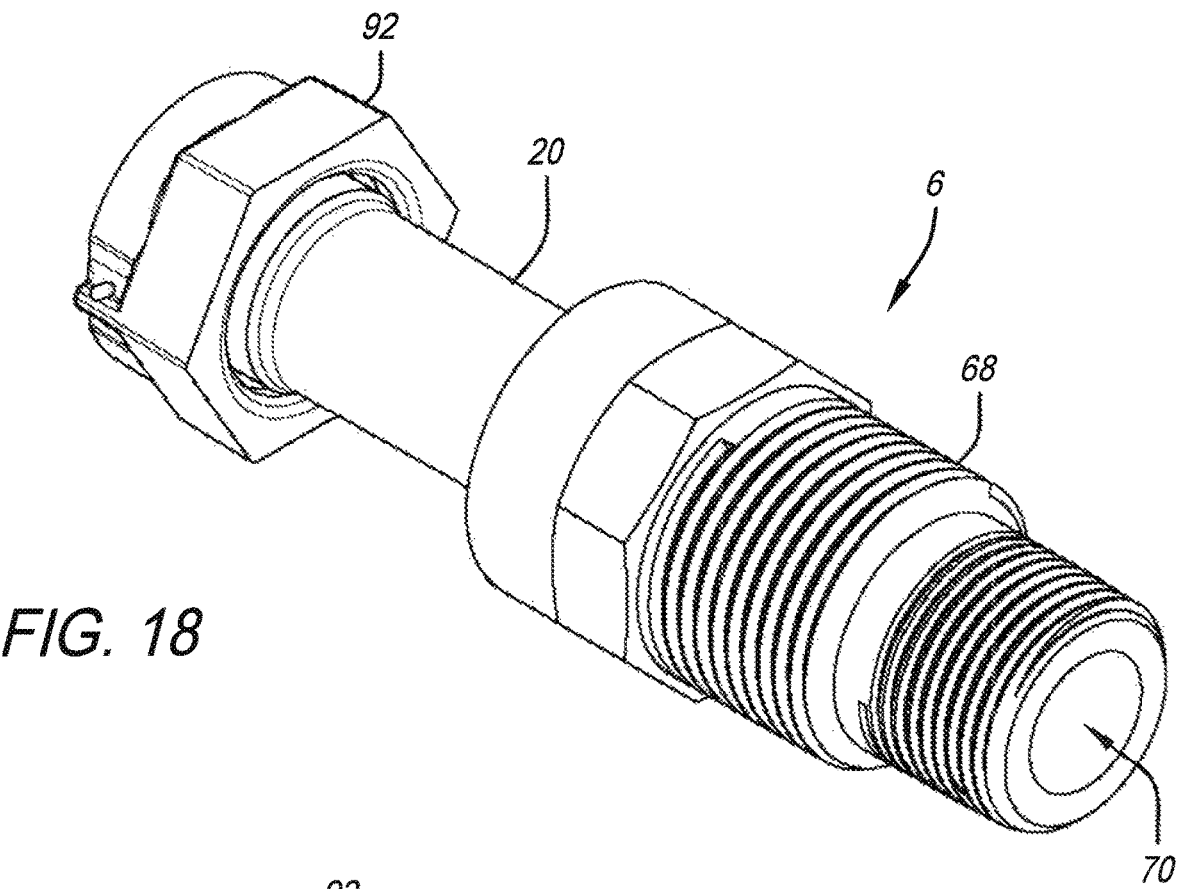
FIG. 18 is a perspective view of the adjustable outlet coupling.
Figure 19:
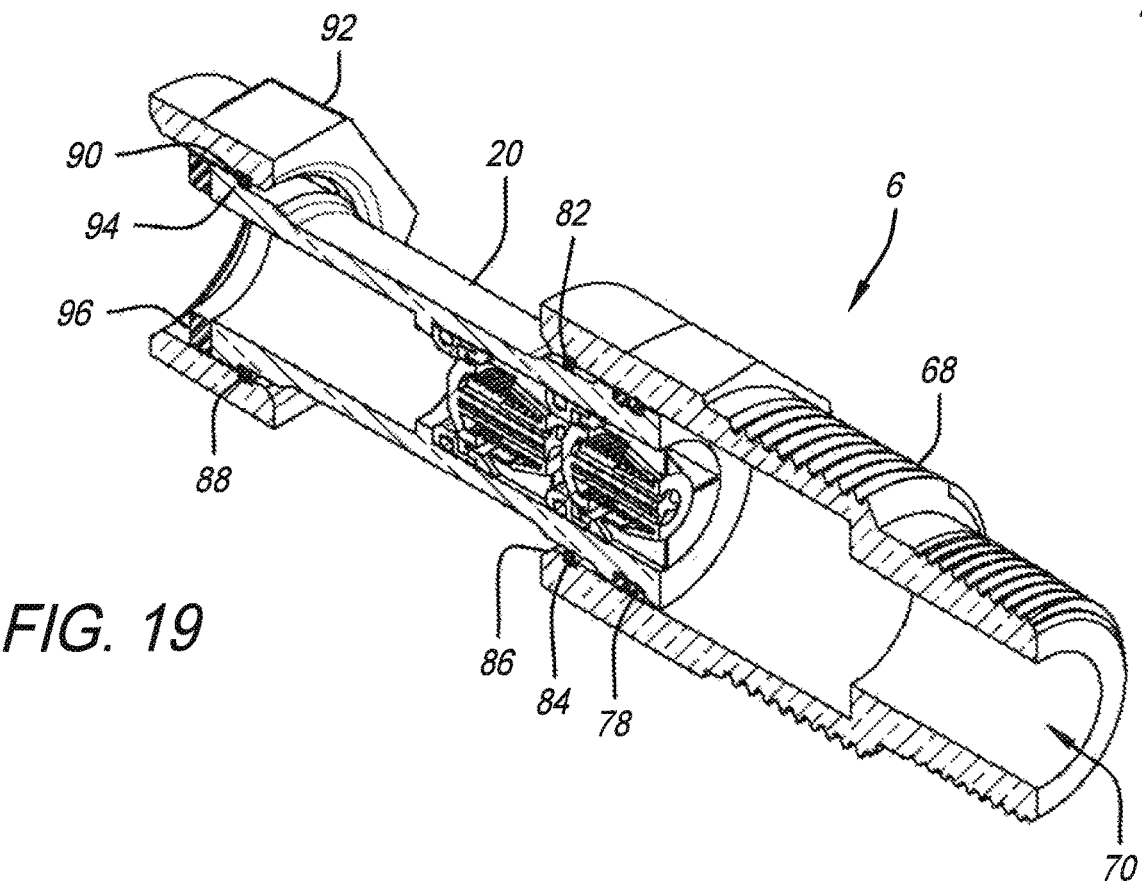
FIG. 19 is a perspective cutaway view of the adjustable outlet coupling.

Perspective and perspective cutaway views of adjustable outlet coupling 6 are shown in FIGS. 18 and 19, respectively. As shown in FIG. 18, telescoping expansion coupling body 20 is extended from body 68. As further shown in the cutaway view of FIG. 19, illustrative snap ring 82 is fitted in peripheral cavity 84 of passageway 70 and engages lip 86 on telescoping expansion coupling body 20 to limit extension of same from body 68. Similarly, for meter coupling nut 92, a snap ring 88 is fitted into channel 90. A lip 94 maintains coupling between meter coupling nut 92 and telescoping expansion coupling body 20. Also shown is gasket 96 abutting the end of telescoping expansion coupling body 20 to create a seal between adjustable outlet coupling 6 and the meter it will be attached to.

Figure 20:
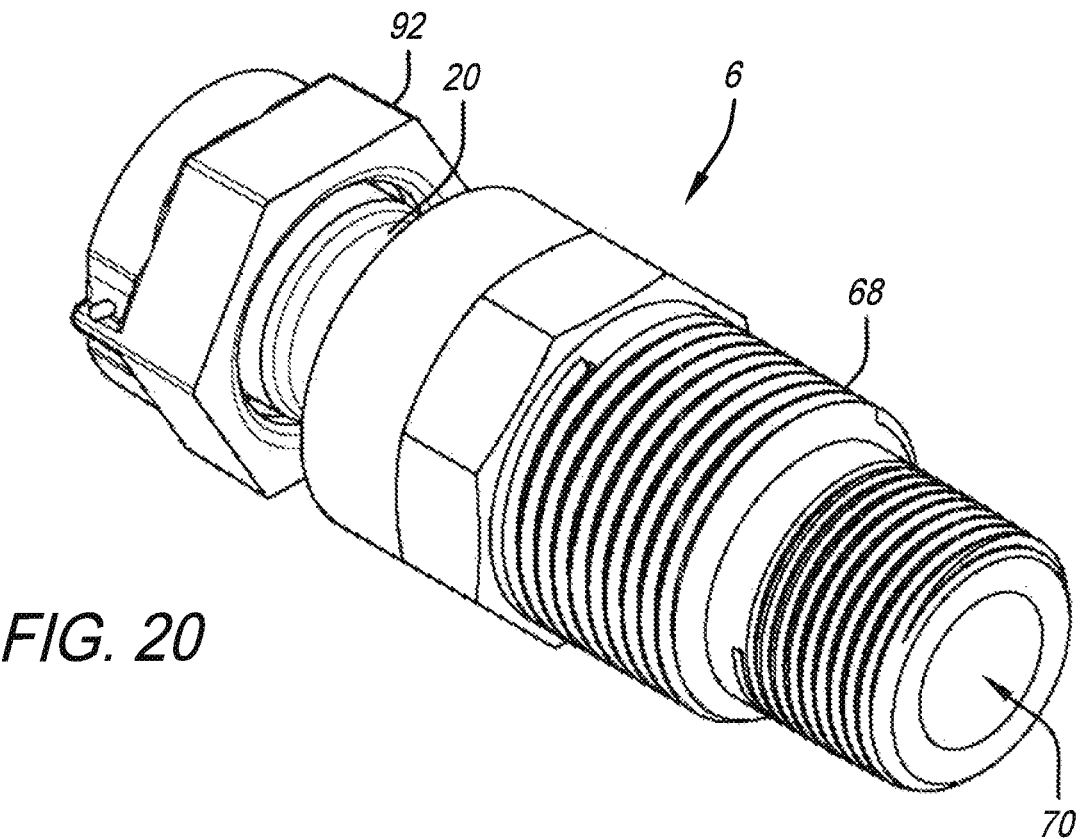
FIG. 20 is another perspective view of the adjustable outlet coupling.
Figure 21:
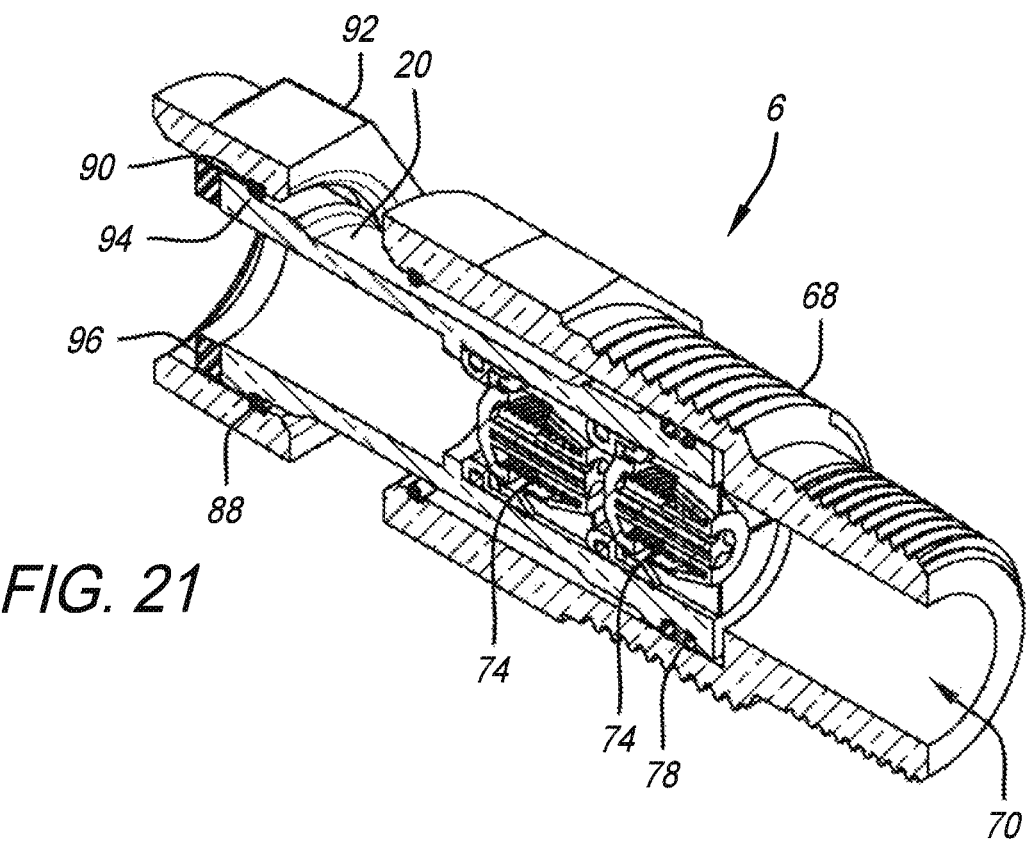
FIG. 21 is another perspective cutaway view of the adjustable outlet coupling.

Perspective and perspective cutaway views of adjustable outlet coupling 6 are shown in FIGS. 20 and 21, respectively. In these views, telescoping expansion coupling body 20 is retracted into body 68. This creates a greater space 16 to accommodate a longer length meter (see, also, FIG. 4). Despite adjustable outlet coupling 6 having a small profile as shown in FIGS. 20 and 21, by virtue of O-rings 78 located between passageway 70 and the outer periphery of telescoping expansion coupling body 20, no fluid leaks from that joint despite the ability of telescoping expansion coupling body 20 to be able to move in directions 26 and 24 between extended and retracted positions.

Further illustrative embodiments of the present disclosure include field serviceable adjustable ball valve and/or outlet coupling assemblies. These field serviceable ball valve and outlet coupling assemblies perform similar functions to that of the previously described adjustable ball valves and couplings except that in these embodiments, portions of the telescoping ball valve and outlet coupling are disassemblable while still attached to the meter tile. In other words, neither ball valve nor coupling is required to be removed from the meter before service. For instance, the field serviceable ball valve assembly or outlet coupling may include a service nut, collar, or other like fastening structure that attaches to the body for retaining the telescoping expansion coupling body to limit the extent to which it can extend from the body. A threaded portion of the body may be located opposite the threads that attach the body to the meter pit. The service nut or collar retains the telescoping expansion coupling body to limit the extent to which it can extend from the body. The service nut is also selectively removable to allow access to the telescoping expansion coupling body and other components within the body, but without having to remove it from the meter tile. This allows for the internals (or telescoping expansion coupling body) of the ball valve or coupling to be accessible for inspection, service and/or replacement.

In an illustrative embodiment, the service nut may be threaded with threads that correspond to threads located on the outer periphery of the body. When coupled, both structures limit movement of the telescoping expansion coupling with respect to the body. The nut can then be unthreaded and removed from the body allowing access therein. Illustratively, the service nut is coupled to the body within the meter tile so the service nut can be unthreaded to access the interior of the body without having to remove the valve our coupling from the meter tile. All that is needed is to gain access to the interior of the meter tile.

It is appreciated that in further embodiments, the service nut may include any variety of thread types, national pipe thread (NPT) threads, compression, or other water works-type connection means. In this and the other embodiments, the connections are not limited to meter connection applications. It is contemplated that such embodiments may be used with meter setters of any variety by changing the thread or other connection type.

Figure 22:
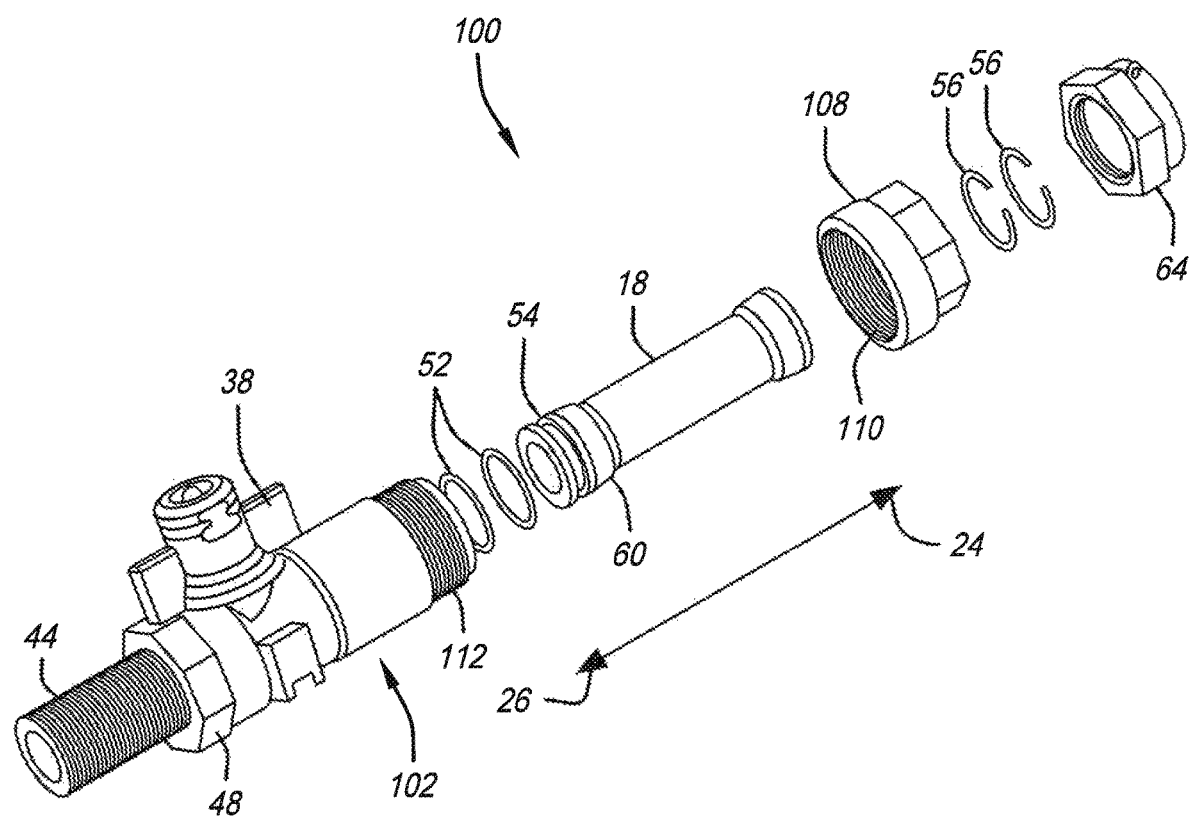
FIG. 22 is an exploded perspective view of a field serviceable adjustable valve assembly.

An exploded perspective view of a field serviceable adjustable ball valve assembly 100 is shown in FIG. 22. Like the prior embodiments, field serviceable adjustable ball valve assembly 100 includes a body 102 with passageway 104 disposed therein (see FIG. 23). Within passageway 104 is a ball valve member 32, knob 38, and other related structures like adjustable ball valve 4. The skilled artisan upon reading this disclosure will appreciate that operation of field serviceable adjustable ball valve assembly 100 is similar to that of adjustable ball valve 4.

Field serviceable adjustable ball valve assembly 100 also includes threaded end coupling 44 attached to body 102 to capture ball valve member 32. A nut 48 threads onto threaded end coupling 44 serving to secure field serviceable adjustable ball valve assembly 100 to sidewall 14 of meter box 2 (see, also, FIG. 1). End coupling 44 of field serviceable adjustable ball valve assembly 100 is configured to extend through the opening in the sidewall of the meter box.

Telescoping expansion coupling body 18 which may be similar or the same as that used with adjustable ball valve 4 is likewise sized to be fitted into passageway 106 similar to passageway 30. Telescoping expansion coupling body 18 is also movable in directions 24 and 26 just like with adjustable ball valve 4. It is appreciated that telescoping expansion coupling body 18 in ball valve assembly 100 may be structurally the same or may be different than telescoping expansion coupling body 18 employed in ball valve 4 depending on the needs. At least one O-ring or a pair of O-rings 52 may be located in illustrative channel 54 disposed about the periphery of telescoping expansion coupling body 18 to provide sealing between it and body 102.

A distinction between adjustable ball valve 4 in the prior embodiment and field serviceable adjustable ball valve assembly 100 here is the latter includes a service nut 108 that has a threaded inner periphery 110 configured to engage threaded outer periphery 112 located on body 102 adjacent its end. A snap ring 56 may be placed in a channel 58 located about the periphery of passageway 114 of service nut 108. With lip 60 formed about the periphery of telescoping expansion coupling body 18, once it is inserted into body 102, telescoping expansion coupling body 18 may move back and forth in directions 24 and 26 to the extent lip 60 engages snap ring 56. This limits the extent to which telescoping expansion coupling body 18 can extend from body 102. At that point telescoping expansion coupling body 18 cannot extend any further.

Another snap ring 56 may be coupled to end channel 62 located about the inner periphery of meter coupling nut 64 to allow same to be rotatably secured to the end of telescoping expansion coupling body 18 opposite body 102. A lip 65 on the outer periphery of telescoping expansion coupling body 18 engages snap ring 56 to couple meter coupling nut 64 to telescoping expansion coupling body 18.

With service nut 108 removed as shown herein, telescoping expansion coupling body 18 is free to be removed from body 102. This allows telescoping expansion coupling body 18 to be serviced or removed to access the interior of body 102 for service as well. With the various components located within assembly 100, having access therein while still attached to meter box 2 can be useful. O-rings, ball valve, or other structures may be inspected, repaired, replaced without removing ball valve assembly 100 from the meter tile. All that is required is for service nut to be unscrewed from threaded outer periphery 112 of body 102. When it is time for reassembling assembly 100, telescoping expansion coupling body 18 may be reinserted into passageway 106 of body 102 and passageway 114 of service nut 108. Threaded inner periphery 110 of service nut 108 may engage threaded outer periphery 112 of body 102 securing the structures together thereby telescopingly securing telescoping expansion coupling body 18 with body 102 allowing normal operation of assembly 100.

Figure 23:
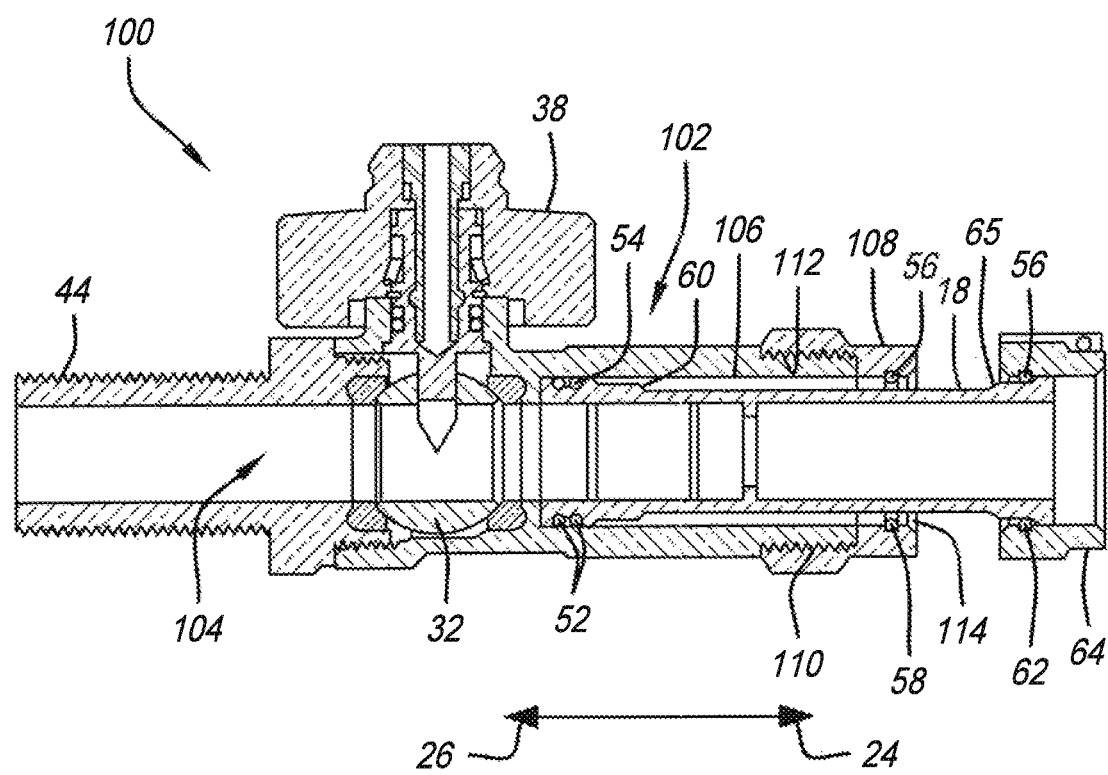
FIG. 23 is a side cross-sectional view of the field serviceable adjustable valve assembly.

A side cross-sectional view of field serviceable adjustable ball valve assembly 100 is shown in FIG. 23. This view also depicts end coupling 44 attached to body 102 to capture ball valve member 32 therein. Similar to adjustable ball valve 4, knob 38 extends from ball valve member 32 in order to operate same. This view also shows telescoping expansion coupling body 18 located within passageway 106 of body 102. It is appreciated that here, like with adjustable ball valve 4, telescoping expansion coupling body 18 may be movable in directions 24 and 26 to vary the distance between the ball valve and another structure such as a water meter. As shown, service nut 108 is threadably coupled to body 102 via threaded inner periphery 110 and threaded outer periphery 112, respectively. The consequence is that telescoping expansion coupling body 18 is extendable a limited amount in directions 24 and 26. Snap ring 56 or other like structure is fitted in channel 58 of service nut 108 to limit the extent to which telescoping expansion coupling body 18 can extend in direction 24. This limitation occurs when lip 60 engages snap ring 56 or other like structure. Otherwise, ball valve assembly 100 operates similar to ball valve 4. But when service nut 108 is unthreaded or unscrewed from body 102 snap ring 56 is no longer an impediment that limits the extent to which telescoping expansion coupling body 18 will extend from body 102. Indeed, this view shows that if service nut 108 is removed, telescoping expansion coupling body 18 can be removed from passageway 106 of body 102 thereby providing access therein for inspection, servicing, or part replacement. Again, this can all be achieved without body 102 of ball valve assembly 100 being removed from meter box 2.

Figure 24:
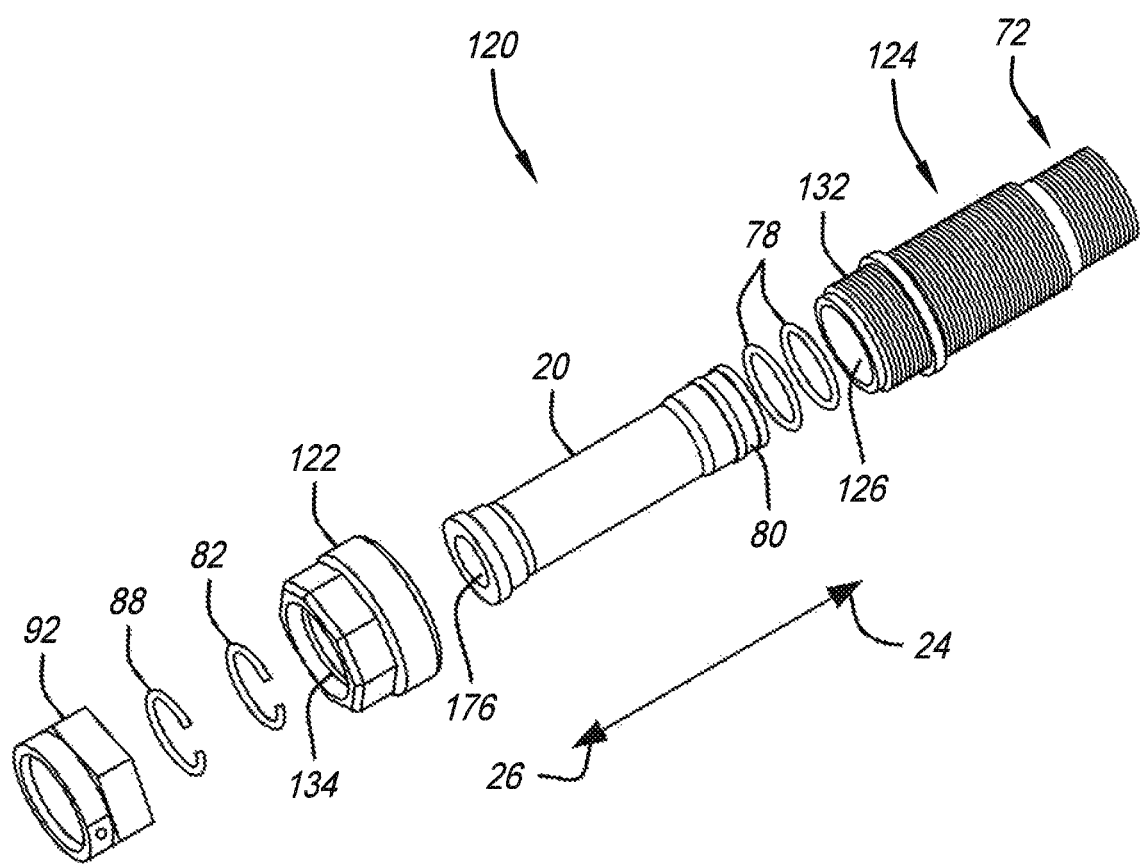
FIG. 24 is an exploded perspective view of the field serviceable adjustable outlet coupling assembly.

An exploded perspective view of a field serviceable adjustable outlet coupling assembly 120 is shown in FIG. 24. Like the field serviceable adjustable ball valve assembly 100 being similar to adjustable ball valve 4, field serviceable adjustable outlet coupling assembly 120 is similar to adjustable outlet coupling 6. That said, field serviceable adjustable outlet coupling assembly 120 is configured to be partially disassembled while still attached to meter box 2 by virtue of a service nut 122 that can be selectively removed from the end of body 124 to permit access to its internal structures.

As shown in FIG. 24, body 124 includes an at least partially threaded end via threads 72 to facilitate attachment of field serviceable adjustable outlet coupling assembly 120 to sidewall 14 of meter box 2. Although not shown here, it is appreciated like in the prior embodiment, optionally one or more check valves 74 may be disposed in passageway 70 to allow water or other fluid to pass in one direction, but not in the other (see, also, FIGS. 10 through 13). Telescoping expansion coupling body 20 is sized to fit into passageway 126 of body 124 so there is fluid communication between passageways 120 and 76. An illustrative pair of O-rings 78 are fitted on peripheral surface 80 of telescoping expansion coupling body 20 to provide a sealing function between telescoping expansion coupling body 20 and the surface of passageway 126 to prevent leaking there between. A snap ring 82 or other like structure fits in an illustrative peripheral cavity 84 of passageway 126 (see, also, FIG. 25) to limit the extent to which telescoping expansion coupling body 20 may extend from body 124 of outlet coupling 120.

Service nut 122 includes a threaded inner periphery 130 (see FIG. 25) that corresponds to threaded outer periphery 132 adjacent and end of body 124. When service nut 122 is threaded onto body 124 with telescoping expansion coupling body 20 located in passageway 126, it also extends through passageway 134 of service nut 122 similar to ball valve assembly 100. Like adjustable outlet coupling 6, outlet coupling assembly 120 includes nut 92 that couples to telescoping expansion coupling body 20 via snap ring 88 that fits into channel 90 of nut 92. Telescoping expansion coupling body 20 can therefore telescopingly move in directions 26 and 24 to adjust the distance between nut 92 and another structure such as the water meter. It will be appreciated by the skilled artisan upon reading this disclosure that when service nut 122 is coupled to body 124, telescoping expansion coupling body 20 is telescopingly movable with respect to body 124 with movement in direction 26 being limited by service nut 122. Conversely, when service nut 122 is unthreaded or unscrewed from body 124, service nut 122 along with telescoping expansion coupling body 20 may be removed from passageway 126 of body 124 allowing service, inspection, or replacement of components related to outlet coupling 120 without removing it from sidewall 14 of meter pit 2.

Figure 25:
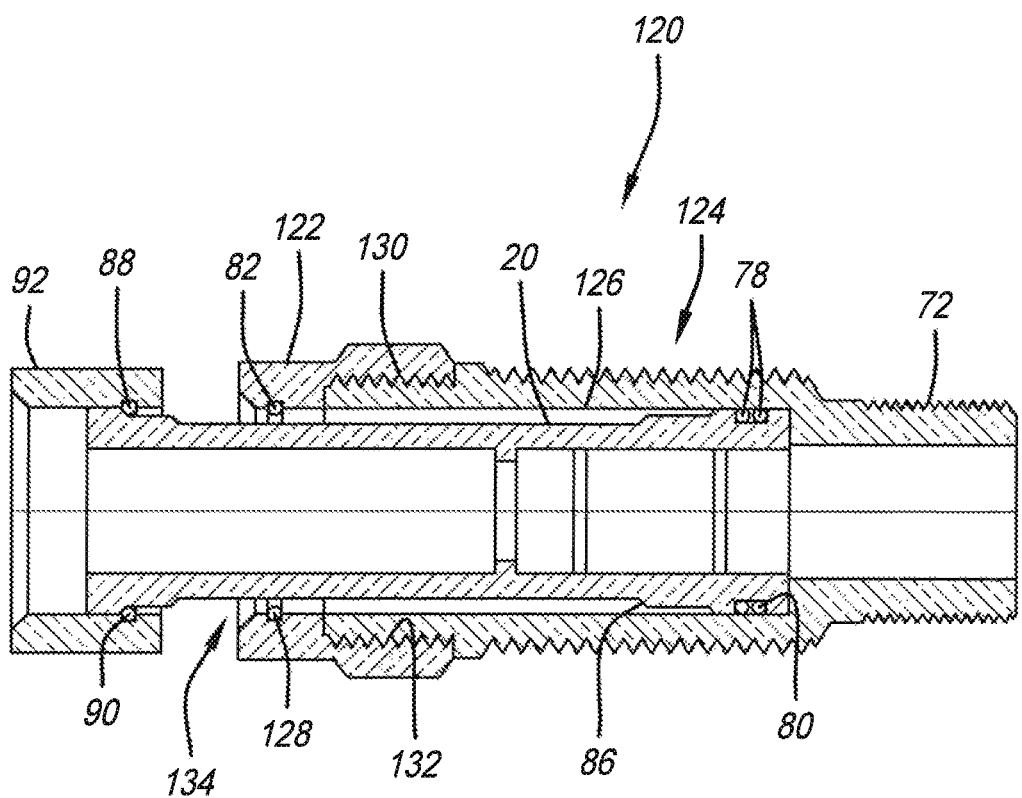
FIG. 25 is a side cross-sectional view of field serviceable adjustable outlet coupling assembly.

A side cross-sectional view of field serviceable adjustable outlet coupling assembly 120 is shown in FIG. 25. This view depicts threads 72 attached to body 124 to attach to the meter box side wall. Telescoping expansion coupling body 20 is located and movable within passageway 126 of body 124 in directions 24 and 26 to vary the distance between outlet coupling assembly 120 and another structure such as a water meter. Service nut 122 is illustratively threadably coupled to body 124 via threaded inner periphery 130 and threaded outer periphery 132, respectively. Snap ring 82 is fitted in channel 128 of service nut 122 to limit the extent to which telescoping expansion coupling body 20 can extend in direction 26 when lip 86 engages snap ring 82. When service nut 122 is unthreaded or unscrewed from body 124 snap ring 82 is no longer an impediment that limits the extent to which telescoping expansion coupling body 20 will extend from body 124. Accordingly, if service nut 122 is removed, telescoping expansion coupling body 22 can be removed from passageway 126 of body 124 as well, thereby providing access therein for inspection, servicing, or part replacement. Again, this can all be achieved without body 124 of outlet coupling assembly 120 being removed from meter box 2.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A meter box comprising:
   a ball valve coupling disposed through a wall of the meter box such that a first portion of the ball valve coupling extends exterior of the meter box and a second portion of the ball valve coupling extends interior of the meter box; and
   an outlet coupling disposed through the wall of the meter box such that a first portion of the outlet coupling extends exterior of the meter box and a second portion of the outlet coupling extends interior of the meter box;
   wherein the second portion of the ball valve coupling is located opposite the second portion of the outlet coupling;
   wherein the ball valve coupling includes a ball valve;
   wherein the second portion of the ball valve coupling includes a telescoping tube that is in fluid communication with the ball valve;
   wherein the telescoping tube of the ball valve coupling is selectively extendable from and retractable into the second portion of the ball valve coupling within the meter box;
   wherein the second portion of the outlet coupling includes a telescoping tube that is in fluid communication with the outlet coupling;
   wherein the telescoping tube of the outlet coupling is selectively extendable from and retractable into the second portion of the outlet coupling within the meter box; and
   wherein a distance between an end of the telescoping tube of the ball valve coupling and an end of the telescoping tube of the outlet coupling is adjustable when at least one telescoping tube, selected from the group consisting of the telescoping tube of the ball valve coupling and the telescoping tube of the outlet coupling, is moved.

2. The meter box of claim 1, wherein the second portion of the ball valve coupling further comprises a body that has a passageway in fluid communication with the ball valve and a threaded end coupling located at the first portion of the ball valve coupling.

3. The meter box of claim 2, wherein the telescoping tube of the ball valve coupling is sized to be fitted into the passageway of the body and is movable therein such that the telescoping tube of the ball valve coupling is in fluid communication with the threaded end coupling.

4. The meter box of claim 3, wherein the telescoping tube of the ball valve coupling is movable linearly within the passageway of the body of the ball valve coupling to and from the ball valve.

5. The meter box of claim 4, further comprising at least one seal that is located between an outer periphery of telescoping tube of the ball valve coupling and an inner periphery of the passageway.

6. The meter box of claim 5, further comprising a first protrusion located about the inner periphery of the passageway in the body of the ball valve coupling, a second protrusion is located about the outer periphery of the telescoping tube of the ball valve coupling so the first protrusion on the inner periphery of the passageway in the body is engageable with the second protrusion that is located about the outer periphery of the telescoping tube to limit the extent to which the telescoping tube extends from the body of the ball valve coupling.

7. The meter box of claim 5, further comprising a ring located about the inner periphery of the passageway in the body of the ball valve coupling, a lip located about the outer periphery of the telescoping tube of the ball valve coupling so the ring is selectively engageable with the lip to limit the extent to which the telescoping tube extends from the body of the ball valve coupling.

8. The meter box of claim 5, further comprising a meter coupling nut coupled to the telescoping tube of the ball valve coupling wherein the coupling nut is configured to be rotatably attachable to a meter.

9. The meter box of claim 8, wherein the telescoping tube of the ball valve coupling includes another protrusion that is located about the outer periphery of the telescoping tube to rotatably couple the meter coupling nut to the telescoping tube.

10. The meter box of claim 9, further comprising a seal located between the meter coupling nut and the telescoping tube of the ball valve coupling.

11. The meter box of claim 5, wherein the second portion of the adjustable outlet coupling includes a body that has a passageway in fluid communication with a threaded end coupling that is located at the first portion of the adjustable outlet coupling.

12. The meter box of claim 11, wherein the telescoping tube of the adjustable outlet coupling is sized to be fitted into the passageway of the body of the adjustable outlet coupling and it is movable therein such that the telescoping tube of the adjustable outlet coupling is in fluid communication with the threaded end coupling of the adjustable outlet coupling.

13. The meter box of claim 12, wherein the telescoping tube of the adjustable outlet coupling is movable linearly within the passageway of the body of the adjustable outlet coupling.

14. The meter box of claim 13, further comprising at least one seal that is located between an outer periphery of the telescoping tube of the adjustable outlet coupling and an inner periphery of the passageway of the adjustable outlet coupling.

15. The meter box of claim 14, further comprising a first protrusion located about the inner periphery of the passageway in the body of the adjustable outlet coupling, and a second protrusion located about the outer periphery of the telescoping tube of the adjustable outlet coupling so the first protrusion on the inner periphery of the passageway in the body of the adjustable outlet coupling is engageable with the second protrusion located about the outer periphery of the telescoping tube of the adjustable outlet coupling to limit the extent to which the telescoping tube extends from the body of the adjustable outlet coupling.

16. The meter box of claim 14, further comprising a ring that is located about the inner periphery of the passageway in the body of the adjustable outlet coupling, and a lip that is located about the outer periphery of the telescoping tube so the ring is engageable with the lip to limit the extent to which the telescoping tube of the adjustable outlet coupling extends from the body of the adjustable outlet coupling.

17. The meter box of claim 15, further comprising a meter coupling nut that is coupled to the telescoping tube of the adjustable outlet coupling, wherein the coupling nut is configured to be attachable to a meter.

18. The meter box of claim 17, wherein the telescoping tube of the adjustable outlet coupling includes another protrusion that is located about the outer periphery of the telescoping tube to rotatably couple the meter coupling nut to the telescoping tube.

19. The meter box of claim 18, further comprising a seal located between the meter coupling nut and the telescoping tube of the adjustable outlet coupling.

20. The meter box of claim 3, further comprising a service nut that has a threaded inner periphery configured to selectively engage and couple to a threaded outer periphery located about a portion of the body of the ball valve coupling, wherein the telescoping tube of the ball valve coupling extends through the service nut, and wherein the service nut limits an extent to which the telescoping tube of the ball valve coupling extends from the body of the ball valve coupling.

21. The meter box of claim 12, further comprising a service nut that has a threaded inner periphery configured to selectively engage and couple to a threaded outer periphery located about a portion of the body of the adjustable outlet coupling, wherein the telescoping tube of the adjustable outlet coupling extends through the service nut, and wherein the service nut limits an extent to which the telescoping tube of the adjustable outlet coupling extends from the body of the adjustable outlet coupling.

22. A meter box comprising:
a valve coupling disposed through a wall of the meter box such that a first portion of the valve coupling extends exterior of the meter box and a second portion of the valve coupling extends interior of the meter box; and
an outlet coupling disposed through the wall of the meter box such that a first portion of the outlet coupling extends exterior of the meter box and a second portion of the outlet coupling extends interior of the meter box;
a telescoping tube located in the meter box, extended into and movable relative to, and in fluid communication with, at least one coupling that is selected from the group consisting of the second portion of the valve coupling and the second portion of the outlet coupling;
wherein the telescoping tube varies a distance between the valve coupling and the outlet coupling within the meter box.

* * * * *